(12) United States Patent
Kerpez

(10) Patent No.: US 11,082,305 B2
(45) Date of Patent: Aug. 3, 2021

(54) SYSTEMS AND METHODS FOR CHAINING CONTROL-PLANE VIRTUAL FUNCTIONS FOR ENSURING END-TO-END QUALITY OF SERVICE (QOS) OF INTERNET SERVICES

(71) Applicant: ASSIA SPE, LLC, Wilmington, DE (US)

(72) Inventor: Kenneth J. Kerpez, Long Valley, NJ (US)

(73) Assignee: ASSIA SPE, LLC, Wilmington, DE (US)

( * ) Notice: Subject to any disclaimer, the term of this patent is extended or adjusted under 35 U.S.C. 154(b) by 8 days.

(21) Appl. No.: 16/024,420

(22) Filed: Jun. 29, 2018

(65) Prior Publication Data

US 2020/0007413 A1 Jan. 2, 2020

(51) Int. Cl.
*H04L 12/24* (2006.01)
*H04L 12/46* (2006.01)

(52) U.S. Cl.
CPC ...... *H04L 41/5003* (2013.01); *H04L 12/4641* (2013.01)

(58) Field of Classification Search
CPC .......... H04L 41/5003; H04L 12/4641
See application file for complete search history.

(56) References Cited

U.S. PATENT DOCUMENTS

| | | | | |
|---|---|---|---|---|
| 9,378,043 | B1* | 6/2016 | Zhang | G06F 9/45558 |
| 2016/0057075 | A1* | 2/2016 | Parikh | H04L 47/762 |
| | | | | 709/226 |
| 2016/0127975 | A1* | 5/2016 | Hu | H04L 45/64 |
| | | | | 455/445 |
| 2017/0104609 | A1* | 4/2017 | McNamee | H04M 15/61 |
| 2017/0257324 | A1* | 9/2017 | Balmakhtar | H04L 41/5009 |
| 2018/0139107 | A1* | 5/2018 | Senarath | H04L 45/302 |

(Continued)

OTHER PUBLICATIONS

Yousaf et al, Network Slicing with Flexible Mobility and QoS/QoE Support for 5G Networks, 2017, IEEE, pp. 1-7 (Year: 2017).*

(Continued)

*Primary Examiner* — John A Follansbee
*Assistant Examiner* — Raqiul A Choudhury
(74) *Attorney, Agent, or Firm* — North Weber and Baugh LLP; Michael North

(57) ABSTRACT

Described are systems and methods for QoS chaining based on control-plane virtual functions for ensuring end-to-end Quality of Service (QoS) of Internet services. The QoS chaining coordinates broadband service delivery via an orchestrated "chain" or Network Service (NS) consisting of control-plane Virtual Network Functions (VNFs) running in the cloud or virtual infrastructure. Separate service elements, network elements, network domains or other service plane or data plane elements or systems have a separate corresponding VNF in the control plane provide monitor and control functions. QoS is ensured End-to-End (E2E) across the chain of VNFs by coordination through the QoS chain or by a coordinating or integrating E2E orchestrator or E2E VNF. The VNFs may be chained, may communicate directly with each other, and may communicate directly with the E2E orchestrator, may communicate with each other through the E2E orchestrator, or may communicate through a shared database.

20 Claims, 8 Drawing Sheets

FIG. 1

(56) References Cited

U.S. PATENT DOCUMENTS

| | | | | |
|---|---|---|---|---|
| 2018/0288614 | A1* | 10/2018 | Zaks | H04W 76/12 |
| 2018/0316615 | A1* | 11/2018 | Shaw | H04L 41/0806 |
| 2018/0359658 | A1* | 12/2018 | Chitrapu | H04L 41/0896 |

OTHER PUBLICATIONS

Herrera et al, Resource Allocation in NFV: A Comprehensive Survey, 2016, IEEE, pp. 518-532 (Year: 2016).*

Liu et al, The research and implementation of cloud computing platform based on docker, Apr. 2015, IEEE, 8 pages.*

ETSI GR NFV-TST 007 V2.5.1 (Aug. 2018), "Network Functions Virtualisation (NFV) Release 2; Testing; Guidelines on Interoperability Testing for MANO," NFV-TST 007v2.5.1—GR—MANO Iop Testing Guidelines.pdf (https://docbox.etsi.org/ISG/NFV/Open/Publications_pdf) (87pgs).

ETSI GS NFV-TST 008 V2.1.1 (May 2017), "Network Functions Virtualisation (NFV) Release 2; Testing; NFVI Compute and Network Metrics Specification," NFV-TST 008v2.1.1—GS—NFVI Compute and Nwk Metrics—Spec.pdf (https://docbox.etsi.org/ISG/NFV/Open/Publications_pdf) (16pgs).

ETSI GS NFV-TST 008 V2.4.1 (Feb. 2018), "Network Functions Virtualisation (NFV) Release 2; Testing; NFVI Compute and Network Metrics Specification," NFV-TST 008v2.4.1—GS—NFVI Compute and Nwk Metrics—Spec.pdf (https://docbox.etsi.org/ISG/NFV/Open/Publications_pdf) (18pgs).

ETSI GS NFV-TST 008 V2.5.1 (Aug. 2018), "Network Functions Virtualisation (NFV) Release 2; Testing; NFVI Compute and Network Metrics Specification," NFV-TST 008v2.5.1—GS—NFVI Compute and Nwk Metrics—Spec.pdf (https://docbox.etsi.org/ISG/NFV/Open/Publications_pdf) (18pgs).

ETSI GS NFV-TST 008 V3.1.1 (Aug. 2018), "Network Functions Virtualisation (NFV) Release 3; Testing; NFVI Compute and Network Metrics Specification," NFV-TST 008v3.1.1—GS—NFVI Compute and Nwk Metrics—Spec.pdf (https://docbox.etsi.org/ISG/NFV/Open/Publications_pdf) (18pgs).

ETSI GS NFV-TST 009 V3.1.1 (Oct. 2018), "Network Functions Virtualisation (NFV) Release 3; Testing; Specification of Networking Benchmarks and Measurement Methods for NFVI," NFV-TST 009v3.1.1—GS—NFVI_Benchmarks.pdf (https://docbox.etsi.org/ISG/NFV/Open/Publications_pdf) (44pgs).

ETSI GR NFV-TST 007 V1.1.1 (Nov. 2017), "Network Functions Virtualisation (NFV); Testing; Guidelines on Interoperability Testing for MANO," NFV-TST007v1.1.1—GR—MANO Iop Testing Guidelines.pdf (https://docbox.etsi.org/ISG/NFV/Open/Publications_pdf)(89pgs).

Network Functions Virtualisation—Introductory White Paper, Issue 1, Published Oct. 22-24, 2012 at the "SDN and OpenFlow World Congress," Darmstadt-Germany, "Network Functions Virtualisation (NFV) An Introduction, Benefits, Enablers, Challenges & Call for action," NFV_White_Paper1_2012.pdf (https://docbox.etsi.org/ISG/NFV/Open/Publications_pdf) (16pgs).

Network Functions Virtualisation—Update White Paper, Issue 1, Published Oct. 15-17, 2013 at the "SDN and OpenFlow World Congress," Frankfurt-Germany, "Network Functions Virtualisation (NFV) Network Operator Perspectives on Industry Progress," NFV_White_Paper2.pdf(https://docbox.etsi.org/ISG/NFV/Open/Publications_pdf) (16pgs).

Network Functions Virtualisation—White Paper #3, Issue 1, Published Oct. 14-17, 2014 at the "SDN & OpenFlow World Congress," Dusseldorf-Germany, "Network Functions Virtualisation (NFV) Network Operator Perspectives on Industry Progress," NFV_White_Paper3.pdf (https://docbox.etsi.org/ISG/NFV/Open/Publications_pdf) (20pgs).

Yan et al., Broadband Forum, SIMR Working Group, "SD-340 Stage 1 for Network Function Virtualization and Programmability in Multi-Service Broadband Network (MSBN)" (58pgs).

Allan, David, The Broadband Forum, "The MSBN as a Platform" Dec. 10, 2014 (8pgs).

Gutierrez, Aranda et al., NFVRG Internet-Draft, Jul. 15, 2018, "High Level VNF Descriptors using NEMO draft-aranda-nfvrg-recursive-vnf-06" (https://datatracker.ietf.org/doc/draft-aranda-nfvrg-recursive-vnf/) (15pgs).

Bernardos, CJ et al., NPV RG Internet-Draft, Sep. 3, 2018, "Multi-domain Network Virtualization draft-bernardos-nfvrg-multidomain-05" (https://datatracker.ietf.org/doc/draft-aranda-nfvrg-recursive-vnf/) (36pgs).

Bernardos, CJ et al., NFVRG Internet-Draft, Sep. 2, 2018, "Network Virtualization Research Challenges draft-irtf-nfvrg-gaps-network-vitualization-10" (https://datatracker.ietf.org/doc/draft-aranda-nfvrg-recursive-vnf/) (40pgs).

Long, Y. et al., nfvrg Internet-Draft, Dec. 27, 2018, "The practice of NFV decoupling test draft-long-nfvrg-nfv-decoupling-test-00" (http://trac.tools.ietf.org/group/irtf/trac/wiki/nfvrg) (7pgs).

Panda, Aurojit, "A New Approach to Network Functions," Sep. 2017 (https://trac.ietf.org/trac/irtf/attachment/wiki/nfvrg/nfvrg_sept_2017_new_approach.pdf) (172pgs).

Keller, Eric, stateless, "Building a better network through disaggregation," (https://trac.ietf.org/trac/irtf/attachment/wiki/nfvrg/nfvrg_sept_2017_stateless.clean-1.pdf; https://trac.ietf.org/trac/irtf/attachment/wiki/nfvrg/nfvrg_sept_2017_stateless.clean-2.pdf) (50pgs).

Krishnan, R., et al., "An Open NFV Architectural Framework for Virality Based Content Caching draft-krishnan-nfvrg-open-nfv-virality-00," Jul. 21, 2014, Internet Research TAsk Force (IRTF) Internet Draft (https://tools.ietf.org/pdf/draft-krishnan-nfvrg-open-nfv-virality-00.pdf) (9pgs).

Krishnan, R., et al., "NFV ISG PoC Proposal—VNF Router Performance with DDoS Functionality," (https://nfvwiki.etsi.org/index.php?title=VNF_Router_Performance_with_DDoS_Functionality).

Krishnan, R., et al., Internet Research Task Force (IRTF) "An Open NFV Architectural Framework for Virality Based Content Caching draft-krishnan-nfvrg-open-nfv-virality-00," Jul. 21, 2014 (https://tools.ietf.org/pdf/draft-krishnan-nfvrg-open-nfv-virality-00.pdf) (9pgs).

D. Kumar, Generic YANG Data Model for Connection-Oriented Operations, Administration, and Maintenance (OAM) Protocols, Internet Engineering Task Force (IETF), RFC 8531, Apr. 2019 (54pgs).

D. Kumar, "Generic YANG Data Model for the Management of Operations, Administration, and Maintenance (OAM) Protocols That Use Connectionless Communications," IETF RFC 8532, Apr. 2019 (59pgs).

D. Kumar, "A YANG Data Model for Retrieval Methods for the Management of Operations, Administration, and Maintenance (OAM) Protocols That Use Connectionless Communications," IETF RFC 8533, Apr. 2019 (41pgs).

ETSI GS NFV-IFA 010 V2.1.1 (Apr. 2016), "Network Functions Virtualisation (NFV); Management and Orchestration; Functional requirements specification," NFV-IFA010v2.1.1—GS—MANO Functional Rqmts Spec.pdf (https://docbox.etsi.org/ISG/NFV/Open/Publications_pdf) (60pgs).

ETSI GS NFV-IFA 010 V2.2.1 (Sep. 2016), "Network Functions Virtualisation (NFV); Management and Orchestration; Functional requirements specification," NFV-IFA010v2.2.1—GS—MANO Functional Rqmts Spec.pdf (https://docbox.etsi.org/ISG/NFV/Open/Publications_pdf) (57pgs).

ETSI GS NFV-IFA 010 V2.3.1 (Aug. 2017), "Network Functions Virtualisation (NFV) Release 2; Management and Orchestration; Functional requirements specification," NFV-IFA010v2.3.1—GS—MANO Functional Rqmts Spec.pdf (https://docbox.etsi.org/ISG/NFV/Open/Publications_pdf) (57pgs).

ETSI GS NFV-IFA 010 V2.4.1 (Feb. 2018), "Network Functions Virtualisation (NFV) Release 2; Management and Orchestration; Functional requirements specification," NFV-IFA010v2.4.1—GS—MANO Functional Rqmts Spec.pdf (https://docbox.etsi.org/ISG/NFV/Open/Publications_pdf) (58pgs).

ETSI GS NFV-IFA 010 V2.5.1 (Aug. 2018), "Network Functions Virtualisation (NFV) Release 2; Management and Orchestration; Functional requirements specification," NFV-IFA010v2.5.1—GS—MANO Functional Rqmts Spec.pdf (https://docbox.etsi.org/ISG/NFV/Open/Publications_pdf) (55pgs).

ETSI GS NFV-IFA 010 V3.1.1 (Aug. 2018), "Network Functions Virtualisation (NFV) Release 3; Management and Orchestration;

(56) References Cited

OTHER PUBLICATIONS

Functional requirements specification," NFV-IFA 010v3.1.1—GS—MANO Functional Rqmts Spec.pdf (https://docbox.etsi.org/ISG/NFV/Open/Publications_pdf) (63pgs).
ETSI GS NFV-IFA 011 V2.1.1 (Oct. 2016), "Network Functions Virtualisation (NFV); Management and Orchestration; VNF Packaging Specification," NFV-IFA 011v2.1.1—GS—VNF Packaging Spec.pdf (https://docbox.etsi.org/ISG/NFV/Open/Publications_pdf) (53pgs).
ETSI GS NFV-IFA 011 V2.3.1 (Aug. 2017), "Network Functions Virtualisation (NFV) Release 2; Management and Orchestration; VNF Packaging Specification," NFV-IFA 011v2.3.1—GS—VNF Packaging Spec.pdf (https://docbox.etsi.org/ISG/NFV/Open/Publications_pdf) (56pgs).
ETSI GS NFV-IFA 011 V2.4.1 (Feb. 2018), "Network Functions Virtualisation (NFV) Release 2; Management and Orchestration; VNF Descriptor and Packaging Specification," NFV-IFA 011v2.4.1—GS—VNF Packaging Spec.pdf (https://docbox.etsi.org/ISG/NFV/Open/Publications_pdf) (60pgs).
ETSI GS NFV-IFA 011 V2.5.1 (Aug. 2018), "Network Functions Virtualisation (NFV) Release 2; Management and Orchestration; VNF Descriptor and Packaging Specification," NFV-IFA 011v2.5.1—GS—VNF Packaging Spec.pdf (https://docbox.etsi.org/ISG/NFV/Open/Publications_pdf) (69pgs).
ETSI GS NFV-IFA 011 V3.1.1 (Aug. 2018), "Network Functions Virtualisation (NFV) Release 3; Management and Orchestration; VNF Descriptor and Packaging Specification," NFV-IFA 011v3.1.1—GS—VNF Packaging Spec.pdf (https://docbox.etsi.org/ISG/NFV/Open/Publications_pdf) (69pgs).
ETSI GR NFV-IFA 012 V3.1.1 (Oct. 2018), "Network Functions Virtualisation (NFV) Release 3; Management and Orchestration; Report on Os-Ma-Nfvo reference point—application and service management use cases and recommendations," NFV-IFA 012v3.1.1—GR—Os-Ma-Nfvo ref point—svc mgmt UCsI.pdf (https://docbox.etsi.org/ISG/NFV/Open/Publications_pdf) (78pgs).
ETSI GS NFV-IFA 013 V2.1.1 (Oct. 2016), "Network Functions Virtualisation (NFV); Management and Orchestration; Os-Ma-Nfvo reference point—Interface and Information Model Specification," NFV-IFA 013v2.1.1—GS—Os-Ma-Nfvo ref point Spec—info model.pdf (https://docbox.etsi.org/ISG/NFV/Open/Publications_pdf) (127pgs).
ETSI GS NFV-IFA 013 V2.3.1 (Aug. 2017), "Network Functions Virtualisation (NFV) Release 2; Management and Orchestration; Os-Ma-Nfvo reference point—Interface and Information Model Specification," NFV-IFA 013v2.3.1—GS—Os-Ma-Nfvo ref point Spec—info model.pdf (https://docbox.etsi.org/ISG/NFV/Open/Publications_pdf) (130pgs).
ETSI GS NFV-IFA 013 V2.4.1 (Feb. 2018), "Network Functions Virtualisation (NFV) Release 2; Management and Orchestration; Os-Ma-Nfvo reference point—Interface and Information Model Specification," NFV-IFA 013v2.4.1—GS—Os-Ma-Nfvo ref point Spec—info model.pdf (https://docbox.etsi.org/ISG/NFV/Open/Publications_pdf) (151pgs).
ETSI GS NFV-IFA 013 V2.5.1 (Aug. 2018), "Network Functions Virtualisation (NFV) Release 2; Management and Orchestration; Os-Ma-Nfvo reference point—Interface and Information Model Specification," NFV-IFA 013v2.5.1—GS—Os-Ma-Nfvo ref point Spec—info model.pdf (https://docbox.etsi.org/ISG/NFV/Open/Publications_pdf) (152pgs).
ETSI GS NFV-IFA 013 V3.1.1 (Aug. 2018), "Network Functions Virtualisation (NFV) Release 3; Management and Orchestration; Os-Ma-Nfvo reference point—Interface and Information Model Specification," NFV-IFA 013v3.1.1—GS—Os-Ma-Nfvo ref point Spec—info model.pdf (https://docbox.etsi.org/ISG/NFV/Open/Publications_pdf) (182pgs).
ETSI GS NFV-IFA 014 V2.1.1 (Oct. 2016), "Network Functions Virtualisation (NFV); Management and Orchestration; Network Service Templates Specification," NFV-IFA 014v2.1.1—GS—Network Service Templates Specification.pdf (https://docbox.etsi.org/ISG/NFV/Open/Publications_pdf) (35pgs).
ETSI GS NFV-IFA 014 V2.3.1 (Aug. 2017), "Network Functions Virtualisation (NFV) Release 2; Management and Orchestration; Network Service Templates Specification," NFV-IFA 014v2.3.1—GS—Network Service Templates Specification.pdf (https://docbox.etsi.org/ISG/NFV/Open/Publications_pdf) (36pgs).
ETSI GS NFV-IFA 014 V2.4.1 (Feb. 2018), "Network Functions Virtualisation (NFV) Release 2; Management and Orchestration; Network Service Templates Specification," NFV-IFA 014v2.4.1—GS—Network Service Templates Spec.pdf (https://docbox.etsi.org/ISG/NFV/Open/Publications_pdf) (40pgs).
ETSI GS NFV-IFA 014 V2.5.1 (Aug. 2018), "Network Functions Virtualisation (NFV) Release 2; Management and Orchestration; Network Service Templates Specification," NFV-IFA 014v2.5.1—GS—Network Service Templates Spec.pdf (https://docbox.etsi.org/ISG/NFV/Open/Publications_pdf) (44pgs).
ETSI GS NFV-IFA 014 V3.1.1 (Aug. 2018), "Network Functions Virtualisation (NFV) Release 3; Management and Orchestration; Network Service Templates Specification," NFV-IFA 014v3.1.1—GS—Network Service Templates Spec.pdf (https://docbox.etsi.org/ISG/NFV/Open/Publications_pdf) (44pgs).
ETSI GR NFV-IFA 015 V2.1.1 (Jan. 2017), "Network Functions Virtualisation (NFV) Release 2; Management and Orchestration; Report on NFV Information Model," NFV-IFA 015v2.1.1—GR—Info Model Report.pdf (https://docbox.etsi.org/ISG/NFV/Open/Publications_pdf) (14pgs).
ETSI GR NFV-IFA 015 V2.1.2 (Jan. 2017), "Network Functions Virtualisation (NFV) Release 2; Management and Orchestration; Report on NFV Information Model," NFV-IFA 015v2.1.2—GR—Info Model Report.pdf (https://docbox.etsi.org/ISG/NFV/Open/Publications_pdf) (14pgs).
ETSI GR NFV-IFA 015 V2.3.1 (Aug. 2017), "Network Functions Virtualisation (NFV) Release 2; Management and Orchestration; Report on NFV Information Model," NFV-IFA 015v2.3.1—GR—Info Model Report.pdf (https://docbox.etsi.org/ISG/NFV/Open/Publications_pdf) (14pgs).
ETSI GR NFV-IFA 015 V2.4.1 (Feb. 2018), "Network Functions Virtualisation (NFV) Release 2; Management and Orchestration; Report on NFV Information Model," NFV-IFA 015v2.4.1—GR—Info Model Report.pdf (https://docbox.etsi.org/ISG/NFV/Open/Publications_pdf) (14pgs).
ETSI GR NFV-IFA 015 V2.5.1 (Aug. 2018), "Network Functions Virtualisation (NFV) Release 2; Management and Orchestration; Report on NFV Information Model," NFV-IFA 015v2.5.1—GR—Info Model Report.pdf (https://docbox.etsi.org/ISG/NFV/Open/Publications_pdf) (14pgs).
ETSI GR NFV-IFA 015 V3.1.1 (Sep. 2018), "Network Functions Virtualisation (NFV) Release 3; Management and Orchestration; Report on NFV Information Model," NFV-IFA 015v3.1.1—GR—Info Model Report.pdf (https://docbox.etsi.org/ISG/NFV/Open/Publications_pdf) (14pgs).
ETSI GR NFV-IFA 016 V2.1.1 (Mar. 2017), "Network Functions Virtualisation (NFV) Release 2; Information Modeling; Papyrus Guidelines," NFV-IFA 016v2.1.1—GR—Papyrus Guidelines.pdf (https://docbox.etsi.org/ISG/NFV/Open/Publications_pdf) (30pgs).
ETSI GR NFV-IFA 016 V2.4.1 (Feb. 2018), "Network Functions Virtualisation (NFV) Release 2; Information Modeling; Papyrus Guidelines," NFV-IFA 016v2.4.1—GR—Papyrus Guidelines.pdf (https://docbox.etsi.org/ISG/NFV/Open/Publications_pdf) (26pgs).
ETSI GR NFV-IFA 016 V2.5.1 (Aug. 2018), "Network Functions Virtualisation (NFV) Release 2; Information Modeling; Papyrus Guidelines," NFV-IFA 016v2.5.1—GR—Papyrus Guidelines.pdf (https://docbox.etsi.org/ISG/NFV/Open/Publications_pdf) (31pgs).
ETSI GR NFV-IFA 016 V3.1.1 (Aug. 2018), "Network Functions Virtualisation (NFV) Release 2; Information Modeling; Papyrus Guidelines," NFV-IFA 016v3.1.1—GR—Papyrus Guidelines.pdf (https://docbox.etsi.org/ISG/NFV/Open/Publications_pdf) (31pgs).
ETSI GR NFV-IFA 017 V2.1.1 (Feb. 2017), "Network Functions Virtualisation (NFV) Release 2; Informational Modeling; UML Modeling Guidelines," NFV-IFA 017v2.1.1—GR—UML Modeling Guidelines.pdf (https://docbox.etsi.org/ISG/NFV/Open/Publications_pdf) (32pgs).
ETSI GR NFV-IFA 017 V2.4.1 (Feb. 2018), "Network Functions Virtualisation (NFV) Release 2; Informational Modeling; UML

(56) References Cited

OTHER PUBLICATIONS

Modeling Guidelines," NFV-IFA 017v2.5.1—GR—UML Modeling Guidelines.pdf (https://docbox.etsi.org/ISG/NFV/Open/Publications_pdf) (33pgs).

ETSI GR NFV-IFA 017 V25.1 (Aug. 2018), "Network Functions Virtualisation (NFV) Release 2; Informational Modeling; UML Modeling Guidelines," NFV-IFA 017v2.5.1—GR—UML Modeling Guidelines.pdf (https://docbox.etsi.org/ISG/NFV/Open/Publications_pdf) (34pgs).

ETSI GR NFV-IFA 017 V3.1.1 (Aug. 2018), "Network Functions Virtualisation (NFV) Release 3; Informational Modeling; UML Modeling Guidelines," NFV-IFA 017v3.1.1—GR—UML Modeling Guidelines.pdf (https://docbox.etsi.org/ISG/NFV/Open/Publications_pdf) (34pgs).

ETSI GS NFV-IFA 018 V3.1.1 (Jul. 2017), "Network Functions Virtualisation (NFV); Acceleration Technologies; Network Acceleration Interface Specification; Release 3," NFV-IFA 018v3.1.1—GS—Acceleration Infface Spec.pdf (https://docbox.etsi.org/ISG/NFV/Open/Publications_pdf) (31pgs).

ETSI GS NFV-IFA 019 V3.1.1 (Jul. 2017), "Network Functions Virtualisation (NFV); Acceleration Technologies; Network Acceleration Interface Specification; Release 3," NFV-IFA 019v3.1.1—GS—Resource Mgmt Acceleration @ Nf-Vi—Spec.pdf (https://docbox.etsi.org/ISG/NFV/Open/Publications_pdf) (32pgs).

ETSI GR NFV-IFA 021 V3.1.1 (Jan. 2018), "Network Functions Virtualisation (NFV) Release 3; Management and Orchestration; Report on management of NFV-MANO and automated deployment of EM and other OSS functions," NFV-IFA 021v3.1.1—GS—MANO and automated deployment report.pdf (https://docbox.etsi.org/ISG/NFV/Open/Publications_pdf) (57pgs).

ETSI GR NFV-IFA 022 V3.1.1 (Apr. 2018), "Network Functions Virtualisation (NFV) Release 3; Management and Orchestration; Report on Management and Connectivity for Multi-Site Services," NFV-IFA 022v3.1.1—GR—Multi-Site Services report.pdf (https://docbox.etsi.org/ISG/NFV/Open/Publications_pdf) (128pgs).

ETSI GR NFV-IFA 023 V3.1.1 (Jul. 2017), "Network Functions Virtualisation (NFV); Management and Orchestration; Report on Policy Management in MANO; Release 3," NFV-IFA 023v3.1.1—GR—Policy Mgmt in MANO report.pdf (https://docbox.etsi.org/ISG/NFV/Open/Publications_pdf) (35pgs).

ETSI GR NFV-IFA 024 V2.1.1 (Mar. 2017), "Network Functions Virtualisation (NFV) Release 2; Information Modeling; Report on External Touchpoints related to NFV Information Model," NFV-IFA 024v2.1.1—GR—NFV IM External touchpoints.pdf (https://docbox.etsi.org/ISG/NFV/Open/Publications_pdf) (14pgs).

ETSI GS NFV-IFA 027 V2.4.1 (May 2018), "Network Functions Virtualisation (NFV) Release 2; Management and Orchestration; Performance Measurements Specification," NFV-IFA 027v2.4.1—GS—Perf. Measurements Spec.pdf (https://docbox.etsi.org/ISG/NFV/Open/Publications_pdf) (39pgs).

ETSI GR NFV-IFA 028 V3.1.1 (Jan. 2018), "Network Functions Virtualisation (NFV) Release 3; Management and Orchestration; Report on architecture options to support multiple administrative domains," NFV-IFA 028v3.1.1—GR—Multi admin domain support—report.pdf (https://docbox.etsi.org/ISG/NFV/Open/Publications_pdf) (59pgs).

ETSI GS NFV-IFA 030 V3.1.1 (Sep. 2018), "Network Functions Virtualisation (NFV) Release 3; Management and Orchestration; Multiple Adminstrative Domain Aspects Interfaces Specification," NFV-IFA 030v3.1.1—GS—Multi Domain MANO spec.pdf (https://docbox.etsi.org/ISG/NFV/Open/Publications_pdf) (23pgs).

ETSI GS NFV-IFA 031 V3.1.1 (Sep. 2018), "Network Functions Virtualisation (NFV) Release 3; Management and Orchestration; Requirements and interfaces specification for manaement of NFV-MANO," NFV-IFA 031v3.1.1—GS—NFV-MANO_mgmt_spec.pdf (https://docbox.etsi.org/ISG/NFV/Open/Publications_pdf) (97pgs).

ETSI GS NFV-INF 001 V1.1.1 (Jan. 2015), "Network Functions Virtualisation (NFV); Infrastructure Overview," NFV-INF 001v1.1.1—GS—Infrastructure Overview.pdf (https://docbox.etsi.org/ISG/NFV/Open/Publications_pdf) (59pgs).

ETSI GS NFV-INF 003 V1.1.1 (Feb. 2014), "Network Functions Virtualisation (NFV); Infrastructure; Compute Domain," NFV-INF 003v1.1.1—GS—Infrastructure Compute Domain.pdf (https://docbox.etsi.org/ISG/NFV/Open/Publications_pdf) (57pgs).

ETSI GS NFV-INF 004 V1.1.1 (Jan. 2015), "Network Functions Virtualisation (NFV); Infrastructure; Hypervisor Domain," NFV-INF 004v1.1.1—GS—Infrastructure Hypervisor Domain.pdf (https://docbox.etsi.org/ISG/NFV/Open/Publications_pdf) (49pgs).

ETSI GS NFV-INF 005 V1.1.1 (Dec. 2014), "Network Functions Virtualisation (NFV); Infrastructure; Network Domain," NFV-INF 005v1.1.1—GS—Infrastructure Network Domain.pdf (https://docbox.etsi.org/ISG/NFV/Open/Publications_pdf) (53pgs).

ETSI GS NFV-INF 007 V1.1.1 (Oct. 2014), "Network Functions Virtualisation (NFV); Infrastructure; Methodology to describe Interfaces and Abstractions," NFV-INF 007v1.1.1—GS—Meth. to desc. Interfaces and Abstractions.pdf (https://docbox.etsi.org/ISG/NFV/Open/Publications_pdf) (30pgs).

ETSI GS NFV-INF 010 V1.1.1 (Dec. 2014), "Network Functions Virtualisation (NFV); Service Quality Metrics," NFV-INF 010v1.1.1—GS—NFV Service Quality Metrics.pdf (https://docbox.etsi.org/ISG/NFV/Open/Publications_pdf) (27pgs).

ETSI GS NFV-MAN 001 V1.1.1 (Feb. 2014), "Network Functions Virtualisation (NFV); Management and Orchestration," NFV-MAN 001v1.1.1—GS—Management and Orchestration.pdf (https://docbox.etsi.org/ISG/NFV/Open/Publications_pdf) (184pgs).

ETSI GS NFV-PER 001 V1.1.1 (Jun. 2014), "Network Functions Virtualisation (NFV); NFV Performance & Portability Best Practices," NFV-PER 001v1.1.1—GS—NFV Performance and Portability Best Practises.pdf (https://docbox.etsi.org/ISG/NFV/Open/Publications_pdf)(65pgs).

ETSI GS NFV-PER 001 V1.1.2 (Dec. 2014), "Network Functions Virtualisation (NFV); NFV Performance & Portability Best Practices," NFV-PER 001v1.1.2—GS—NFV Performance and Portability Best Practises.pdf (https://docbox.etsi.org/ISG/NFV/Open/Publications_pdf)(65pgs).

ETSI GS NFV-PER 002 V1.1.1 (Oct. 2013), "Network Functions Virtualisation (NFV); Proof of Concepts; Framework" NFV-PER 002v1.1.1—GS—NFV PoC Framework.pdf (https://docbox.etsi.org/ISG/NFV/Open/Publications_pdf) (16pgs).

ETSI GS NFV-PER 002 V1.1.2 (Dec. 2014), "Network Functions Virtualisation (NFV); Proof of Concepts; Framework," NFV-PER 002v1.1.2—GS—NFV PoC Framework revision.pdf (https://docbox.etsi.org/ISG/NFV/Open/Publications_pdf) (17pgs).

ETSI GS NFV-REL 001 V1.1.1 (Jan. 2015), "Network Functions Virtualisation (NFV); Resiliency Requirements," NFV-REL 001v1.1.1—GS—Resiliency Requirements.pdf (https://docbox.etsi.org/ISG/NFV/Open/Publications_pdf) (82pgs).

ETSI GS NFV-REL 002 V1.1.1 (Sep. 2015), "Network Functions Virtualisation (NFV); Reliability; Report on Scalable Architectures for Reliability Management," NFV-REL 002v1.1.1—GS—Scalable Arch for Reliability Report.pdf (https://docbox.etsi.org/ISG/NFV/Open/Publications_pdf) (32pgs).

ETSI GS NFV-REL 003 V1.1.1 (Apr. 2016), "Network Functions Virtualisation (NFV); Reliability; Report on Models and Features for End-to-End Reliability," NFV-REL 003v1.1.1—GS—E2E reliability models report.pdf (https://docbox.etsi.org/ISG/NFV/Open/Publications_pdf)(105pgs).

ETSI GS NFV-REL 003 V1.1.2 (Jul. 2016), "Network Functions Virtualisation (NFV); Reliability; Report on Models and Features for End-to-End Reliability," NFV-REL 003v1.1.2—GS—E2E reliability models report.pdf (https://docbox.etsi.org/ISG/NFV/Open/Publications_pdf) (106pgs).

ETSI GS NFV-REL 004 V1.1.1 (Apr. 2016), "Network Functions Virtualisation (NFV); Assurance; Report on Active Monitoring and Failure Detection," NFV-REL 004v1.1.1—GS—Active monitoring and failure detection report.pdf (https://docbox.etsi.org/ISG/NFV/Open/Publications_pdf) (61pgs).

ETSI GS NFV-REL 005 V1.1.1 (Jan. 2016), "Network Functions Virtualisation (NFV); Accountability; Report on Quality Accountability Framework," NFV-REL 005v1.1.1—GS—Quality Accountability Framework.pdf (https://docbox.etsi.org/ISG/NFV/Open/Publications_pdf) (40pgs).

(56) References Cited

OTHER PUBLICATIONS

ETSI GS NFV-REL 006 V3.1.1 (Feb. 2018), "Network Functions Virtualisation (NFV) Release 3; Reliability; Maintaining Service Availability and Continuity Upon Software Modification," NFV-REL 006v3.1.1—GS—SW Upgrade spec.pdf (https://docbox.etsi.org/ISG/NFV/Open/Publications_pdf) (50pgs).

ETSI GR NFV-REL 007 V1.1.1 (Sep. 2017), "Network Functions Virtualisation (NFV); Reliability; Report on the resilience of NFV-MANO critical capabilities," NFV-REL 007v111—GR—MANO Resilience report.pdf (https://docbox.etsi.org/ISG/NFV/Open/Publications_pdf) (45pgs).

ETSI GR NFV-REL 007 V1.1.2 (Oct. 2017), "Network Functions Virtualisation (NFV); Reliability; Report on the resilience of NFV-MANO critical capabilities," NFV-REL 007v112—GR—MANO Resilience report.pdf (https://docbox.etsi.org/ISG/NFV/Open/Publications_pdf) (45pgs).

ETSI GS NFV-SEC 001 V1.1.1 (Oct. 2014), "Network Functions Virtualisation (NFV); NFV Security; Problem Statement," NFV-SEC 001v1.1.1—GS—Security Problem Statement.pdf (https://docbox.etsi.org/ISG/NFV/Open/Publications_pdf) (37pgs).

ETSI GS NFV-SEC 002 V1.1.1 (Aug. 2015), "Network Functions Virtualisation (NFV); NFV Security; Cataloguing security Features in management software," NFV-SEC 002v1.1.1—GS—Security features in mgmt sofware report.pdf (https://docbox.etsi.org/ISG/NFV/Open/Publications_pdf) (27pgs).

ETSI GS NFV-SEC 003 V1.1.1 (Dec. 2014), "Network Functions Virtualisation (NFV); NFV Security; Security and Trust Guidance," NFV-SEC 003v1.1.1—GS—Security and Trust Guidance.pdf (https://docbox.etsi.org/ISG/NFV/Open/Publications_pdf) (57pgs).

ETSI GS NFV-SEC 004 V1.1.1 (Sep. 2015), "Network Functions Virtualisation (NFV); NFV Security; Privacy and Regulation; Report on Lawful Interception Implications," NFV-SEC 004v1.1.1—GS—LI report.pdf (https://docbox.etsi.org/ISG/NFV/Open/Publications_pdf)(15pgs).

ETSI GR NFV-SEC 005 V1.1.1 (Jan. 2019), "Network Functions Virtualisation (NFV); Trust; Report on Certificate Management," NFV-SEC 005v1.1.1—GR—Certificate mgmt report.pdf (https://docbox.etsi.org/ISG/NFV/Open/Publications_pdf) (38pgs).

ETSI GS NFV-SEC 006 V1.1.1 (Apr. 2016), "Network Functions Virtualisation (NFV); Security Guide; Report on Security Aspects and Regulatory Concerns," NFV-SEC 006v1.1.1—GS—Sec and Regulation report.pdf (https://docbox.etsi.org/ISG/NFV/Open/Publications_pdf) (29pgs).

ETSI GR NFV-SEC 007 V1.1.1 (Oct. 2017), "Network Functions Virtualisation (NFV); Trust; Report on Attestation Technologies and Practices for Secure Deployments," NFV-SEC 007v1.1.1—GR—NFV Attestation report.pdf (https://docbox.etsi.org/ISG/NFV/Open/Publications_pdf) (32pgs).

ETSI GS NFV-SEC 009 V1.1.1 (Dec. 2015), "Network Functions Virtualisation (NFV); NFV Security; Report on use cases and technical approaches for multi-layer host administration," NFV-SEC 009v1.1.1—GS—UCs for multi-layer host admin.pdf (https://docbox.etsi.org/ISG/NFV/Open/Publications_pdf) (49pgs).

ETSI GR NFV-SEC 009 V1.2.1 (Jan. 2017), "Network Functions Virtualisation (NFV); NFV Security; Report on use cases and technical approaches for multi-layer host administration," NFV-SEC 009v1.2.1—GR—UCs for multi-layer host admin.pdf (https://docbox.etsi.org/ISG/NFV/Open/Publications_pdf) (51pgs).

ETSI GS NFV-SEC 010 V1.1.1 (Apr. 2016), "Network Functions Virtualisation (NFV); NFV Security; Report on Retained Data problem statement and requirements," NFV-SEC 010v1.1.1—GS—Retained Data Report.pdf (https://docbox.etsi.org/ISG/NFV/Open/Publications_pdf)(12pgs).

ETSI GR NFV-SEC 011 V1.1.1 (Apr. 2018), "Network Functions Virtualisation (NFV); Security; Report on NFV LI Architecture," NFV-SEC 011v1.1.1—GR—LI Architecture Report.pdf (https://docbox.etsi.org/ISG/NFV/Open/Publications_pdf) (49pgs).

ETSI GS NFV-SEC 012 V3.1.1 (Jan. 2017), "Network Functions Virtualisation (NFV); Release 3; Security; System architecture specification for execution of sensitive NFV components," NFV-SEC 012v3.1.1—GS—Arch for sensitive components—Spec.pdf (https://docbox.etsi.org/ISG/NFV/Open/Publications_pdf) (17pgs).

ETSI GS NFV-SEC 013 V3.1.1 (Feb. 2017), "Network Functions Virtualisation (NFV) Release 3; Security; Security Management and Monitoring specification," NFV-SEC 013v3.1.1—GS—Sec mgmt and Monitoring Spec.pdf (https://docbox.etsi.org/ISG/NFV/Open/Publications_pdf) (54pgs).

ETSI GS NFV-SEC 014 V3.1.1 (Apr. 2018), "Network Functions Virtualisation (NFV) Release 3; NFV Security; Security Specification for MANO Components and Reference Points," NFV-SEC 014v3.1.1—GS—MANO Security Spec.pdf (https://docbox.etsi.org/ISG/NFV/Open/Publications_pdf) (15pgs).

ETSI GS NFV-SOL 001 V2.5.1 (Dec. 2018), "Network Functions Virtualisation (NFV) Release 2; Protocols and Data Models; NFV descriptors based on TOSCA specification," NFV-SOL 001v2.5.1—GS—TOSCA-based NFV descriptors spec.pdf (https://docbox.etsi.org/ISG/NFV/Open/Publications_pdf) (205pgs).

ETSI GS NFV-SOL 002 V2.3.1 (Aug. 2017), "Network Functions Virtualisation (NFV) Release 2; Protocols and Data Models; RESTful protocols specification for the Ve-Vnfm Reference Point," NFV-SOL 002v2.3.1—GS—Ve-Vnfm RESTful protocols spec.pdf (https://docbox.etsi.org/ISG/NFV/Open/Publications_pdf) (216pgs).

ETSI GS NFV-SOL 002 V2.4.1 (Feb. 2018), "Network Functions Virtualisation (NFV) Release 2; Protocols and Data Models; RESTful protocols specification for the Ve-Vnfm Reference Point," NFV-SOL 002v2.4.1—GS—Ve-Vnfm RESTful protocols spec.pdf (https://docbox.etsi.org/ISG/NFV/Open/Publications_pdf) (228pgs).

ETSI GS NFV-SOL 002 V2.5.1 (Sep. 2018), "Network Functions Virtualisation (NFV) Release 2; Protocols and Data Models; RESTful protocols specification for the Ve-Vnfm Reference Point," NFV-SOL 002v2.5.1—GS—Ve-Vnfm RESTful protocols spec.pdf (https://docbox.etsi.org/ISG/NFV/Open/Publications_pdf) (248pgs).

ETSI GS NFV-SOL 003 V2.3.1 (Jul. 2017), "Network Functions Virtualisation (NFV) Release 2; Protocols and Data Models; RESTful protocols specification for the Or-Vnfm Reference Point," NFV-SOL 003v2.3.1—GS—Or-Vnfm RESTful protocols spec.pdf (https://docbox.etsi.org/ISG/NFV/Open/Publications_pdf) (273pgs).

ETSI GS NFV-SOL 004 V2.3.1 (Jul. 2017), "Network Functions Virtualisation (NFV) Release 2; Protocols and Data Models; VNF Package specification," NFV-SOL 004v2.3.1—GS—VNF Package Stage 3 spec.pdf (https://docbox.etsi.org/ISG/NFV/Open/Publications_pdf) (17pgs).

ETSI GS NFV-SOL 004 V2.4.1 (Feb. 2018), "Network Functions Virtualisation (NFV) Release 2; Protocols and Data Models; VNF Package specification," NFV-SOL 004v2.4.1—GS—VNF Package Stage 3 spec.pdf (https://docbox.etsi.org/ISG/NFV/Open/Publications_pdf) (19pgs).

ETSI GS NFV-SOL 004 V2.5.1 (Sep. 2018), "Network Functions Virtualisation (NFV) Release 2; Protocols and Data Models; VNF Package specification," NFV-SOL 004v2.5.1—GS—VNF Package Stage 3 spec.pdf (https://docbox.etsi.org/ISG/NFV/Open/Publications_pdf) (21pgs).

ETSI GS NFV-SOL 005 V2.4.1 (Feb. 2018), "Network Functions Virtualisation (NFV) Release 2; Protocols and Data Models; RESTful protocols specification for the Os-Ma-nfvo Reference Point," NFV-SOL 005v2.4.1—GS—Os-Ma-nfvo APIs.pdf (https://docbox.etsi.org/ISG/NFV/Open/Publications_pdf) (295pgs).

ETSI GS NFV-SOL 005 V2.5.1 (Sep. 2018), "Network Functions Virtualisation (NFV) Release 2; Protocols and Data Models; RESTful protocols specification for the Os-Ma-nfvo Reference Point,"NFV-SOL 005v2.5.1—GS—Os-Ma-nfvo APIs.pdf (https://docbox.etsi.org/ISG/NFV/Open/Publications_pdf) (312pgs).

ETSI GS NFV-SOL 007 V2.5.1 (Dec. 2018), "Network Functions Virtualisation (NFV) Release 2; Protocols and Data Models; Network Service Descriptor File Structure Specification," NFV-SOL 007v2.5.1—GS—NSD file structure spec.pdf (https://docbox.etsi.org/ISG/NFV/Open/Publications_pdf) (16pgs).

ETSI GS NFV-TST 001 V1.1.1 (Apr. 2016), "Network Functions Virtualisation (NFV); Pre-deployment Testing; Report on Validation of NFV Environments and Services," NFV-TST 001v1.1.1—GS—Pre-deployment Validation report.pdf (https://docbox.etsi.org/ISG/NFV/Open/Publications_pdf) (73pgs).

(56) References Cited

OTHER PUBLICATIONS

ETSI GS NFV-TST 002 V1.1.1 (Oct. 2016), "Network Functions Virtualisation (NFV); Testing Methodology; Report on NFV Interoperability Testing Methodology," NFV-TST 002v1.1.1—GS—Iop Testing Methodology report.pdf (https://docbox.etsi.org/ISG/NFV/Open/Publications_pdf) (47pgs).
ETSI GR NFV-TST 004 V1.1.1 (May 2017), "Network Functions Virtualisation (NFV); Testing; Guidelines for Test Plan on Path Implementation throught NFVI," NFV-TST 004v1.1.1—GR—NFVI_PATH_TEST report.pdf (https://docbox.etsi.org/ISG/NFV/Open/Publications_pdf) (25pgs).
ETSI GR NFV-TST 004 V1.1.2 (Jul. 2017), "Network Functions Virtualisation (NFV); Testing; Guidelines for Test Plan on Path Implementation throught NFVI," NFV-TST 004v1.1.2—GR—NFVI_PATH_TEST report.pdf (https://docbox.etsi.org/ISG/NFV/Open/Publications_pdf) (25pgs).
ETSI GR NFV-TST 005 V3.1.1 (Mar. 2017), "Network Functions Virtualisation (NFV); Continuous Development and Integration; Report on use cases and recommendations for VNF Snapshot," NFV-TST 005v3.1.1—GR—VNF_snapshot_report.pdf (https://docbox.etsi.org/ISG/NFV/Open/Publications_pdf) (58pgs).
ETSI GS NFV, "Network Functions Virtualisation (NFV); Use Cases," V1.1.1, Oct. 2013 (http://www.etsi.org/deliver/etsi_gs/NFV/001_099/001/01.01.01_60/gs_NFV001v010101p.pdf) (50pgs).
Broadband Forum SD-340, "Stage 1 for Network Function Virtualization and Programmability in Multi-Service Broadband Network (MSBN)" (58pgs).
Broadband Forum TR-416, "CloudCO Use Cases and Scenarios," Issue: 1, Issue Date: Apr. 2018 (88pgs).
ETSI GS NFV 001 V1.1.1 (Oct. 2013), "Network Functions Virtualisation (NFV) Use Cases" NFV 001v1.1.1—GS—NFV Use Cases.pdf (https://docbox.etsi.org/ISG/NFV/Open/Publications_pdf) (50pgs).
ETSI GR NFV 001 V1.2.1 (May 2017), "Network Functions Virtualisation (NFV); Use Cases" NFV 001v1.2.1—GR—NFV Use Cases revision.pdf (https://docbox.etsi.org/ISG/NFV/Open/Publications_pdf) (81pgs).
ETSI GS NFV 002 V1.1.1 (Oct. 2013), "Network Functions Virtualisation (NFV); Architectural Framework" NFV 002v1.1.1—GS—NFV Architectural Framework.pdf (https://docbox.etsi.org/ISG/NFV/Open/Publications_pdf) (21pgs).
ETSI GS NFV 002 V1.2.1 (Dec. 2014), "Network Functions Virtualisation (NFV); Architectural Framework" NFV 002v1.2.1—GS—NFV Architectural Framework.pdf (https://docbox.etsi.org/ISG/NFV/Open/Publications_pdf) (21pgs).
ETSI GS NFV 003 V1.1.1 (Oct. 2013), "Network Functions Virtualisation (NFV); Terminology for Main Concepts in NFV" NFV 003v1.1.1—GS—Terminology for Main Concepts in NFV.pdf (https://docbox.etsi.org/ISG/NFV/Open/Publications_pdf) (10pgs).
ETSI GS NFV 003 V1.2.1 (Dec. 2014), "Network Functions Virtualisation (NFV); Terminology for Main Concepts in NFV" NFV 003v1.2.1—GS—Terminology for Main Concepts in NFV.pdf (https://docbox.etsi.org/ISG/NFV/Open/Publications_pdf) (13pgs).
ETSI GS NFV 003 V3.2.1 (Dec. 2014), "Network Functions Virtualisation (NFV); Terminology for Main Concepts in NFV" NFV 003v1.3.1—GR—Terminology for Main Concepts in NFV.pdf (https://docbox.etsi.org/ISG/NFV/Open/Publications_pdf) (17pgs).
ETSI GS NFV 003 V1.4.1 (Aug. 2018), "Network Functions Virtualisation (NFV); Terminology for Main Concepts in NFV" NFV 003v1.4.1—GS—Terminology.pdf (https://docbox.etsi.org/ISG/NFV/Open/Publications_pdf) (21pgs).
ETSI GS NFV 004 V1.1.1 (Oct. 2013), "Network Functions Virtualisation (NFV); Virtualisation Requirements" NFV 004v1.1.1—GS—NFV Virtualisation Requirements.pdf (https://docbox.etsi.org/ISG/NFV/Open/Publications_pdf) (17pgs).
ETSI GS NFV-EVE 001 V3.1.1 (Jul. 2017), "Network Functions Virtualisation (NFV); Virtualisation Technologies; Hypervisor Domain Requirements specification; Release 2" NFV-EVE 001v3.1.1—GS—Hypervisor Rqmts spec.pdf (https://docbox.etsi.org/ISG/NFV/Open/Publications_pdf) (15pgs).

ETSI GS NFV-EVE 003 V1.1.1 (Jan. 2016), "Network Functions Virtualisation (NFV); Ecosystem; Report on NFVI Node Physical Architecture Guidelines for Multi-Vendor Environment" NFV-EVE 003v1.1.1—GS—NFVI Node Arch report.pdf (https://docbox.etsi.org/ISG/NFV/Open/Publications_pdf) (47pgs).
ETSI GS NFV-EVE 004 V1.1.1 (Mar. 2016), "Network Functions Virtualisation (NFV); Virtualisation Technologies; Report on the application of Different Virtualisation Technologies in the NFV Framework" NFV-EVE 004v1.1.1—GS—Virtualisation technologies Report.pdf (https://docbox.etsi.org/ISG/NFV/Open/Publications_pdf) (23pgs).
ETSI GS NFV-EVE 005 V1.1.1 (Dec. 2015), "Network Functions Virtualisation (NFV); Ecosystem; Report on SDN Usage in NFV Architectural Framework" NFV-EVE 005v1.1.1—GS—SDN usage in NFV Report.pdf (https://docbox.etsi.org/ISG/NFV/Open/Publications_pdf) (125pgs).
ETSI GS NFV-EVE 007 V3.1.1 (Mar. 2017), "Network Functions Virtualisation (NFV); Release 3; NFV Evolution and Ecosystem; Hardware Interoperability Requirements Specificaiton" NFV-EVE 007v3.1.1—GS—NFVI Hw rqmts spec.pdf (https://docbox.etsi.org/ISG/NFV/Open/Publications_pdf) (28pgs).
ETSI GS NFV-EVE 007 V3.1.2 (Mar. 2017), "Network Functions Virtualisation (NFV); Release 3; NFV Evolution and Ecosystem; Hardware Interoperability Requirements Specificaiton" NFV-EVE 007v3.1.2—GS—NFVI Hw rqmts spec.pdf (https://docbox.etsi.org/ISG/NFV/Open/Publications_pdf) (29pgs).
ETSI GR NFV-EVE 008 V3.1.1 (Dec. 2017), "Network Functions Virtualisation (NFV); Release 3; Charging; Report on Usage Metering and Charging Use Cases and Archetectural Study" NFV-EVE 008v3.1.1—GR—Charging and Billing report.pdf (https://docbox.etsi.org/ISG/NFV/Open/Publications_pdf) (26pgs).
ETSI GR NFV-EVE 010 V3.1.1 (Dec. 2017), "Network Functions Virtualisation (NFV); Release 3; Licensing Management; Report on License Management for NFV" NFV-EVE 010v3.1.1—GR—License Management report.pdf (https://docbox.etsi.org/ISG/NFV/Open/Publications_pdf) (31pgs).
ETSI GS NFV-EVE 011 V3.1.1 (Oct. 2018), "Network Functions Virtualisation (NFV); Release 3; Virtualised Network Function; Specification of the Classification of Cloud Native VNF implementations" NFV-EVE 011v3.1.1—GS—Cloud Native VNF Classification Spec.pdf (https://docbox.etsi.org/ISG/NFV/Open/Publications_pdf) (30pgs).
ETSI GR NFV-EVE 012 V3.1.1 (Dec. 2017), "Network Functions Virtualisation (NFV); Release 3; Evolution and Ecosystem; Report on Network Slicing Support with ETSI NFV Architecture Framework," NFV-EVE 012 v3.1.1—GR—Network Slicing report.pdf (https://docbox.etsi.org/ISG/NFV/Open/Publications_pdf) (35pgs).
ETSI GS NFV-IFA 001 V1.1.1 (Dec. 2015), "Network Functions Virtualisation (NFV); Acceleration Technologies; Report on Acceleration Technologies & Use Cases" NFV-IFA 001v1.1.1—GS—Acceleration—UCs report.pdf (https://docbox.etsi.org/ISG/NFV/Open/Publications_pdf) (38pgs).
ETSI GS NFV-IFA 002 V2.1.1 (Mar. 2016), "Network Functions Virtualisation (NFV); Acceleration Technologies; VNF Interfaces Specification" NFV-IFA 002v2.1.1—GS—Acceleration—VNF Intface Spec.pdf (https://docbox.etsi.org/ISG/NFV/Open/Publications_pdf) (30pgs).
ETSI GS NFV-IFA 002 V2.3.1 (Aug. 2017), "Network Functions Virtualisation (NFV) Release 2; Acceleration Technologies; VNF Interfaces Specification" NFV-IFA 002v2.3.1—GS—Acceleration—VNF Intface Spec.pdf (https://docbox.etsi.org/ISG/NFV/Open/Publications_pdf) (64pgs).
ETSI GS NFV-IFA 002 V2.4.1 (Feb. 2018), "Network Functions Virtualisation (NFV) Release 2; Acceleration Technologies; VNF Interfaces Specification" NFV-IFA 002v2.4.1—GS—Acceleration—VNF Intface Spec.pdf (https://docbox.etsi.org/ISG/NFV/Open/Publications_pdf) (64pgs).
ETSI GS NFV-IFA 003 V2.1.1 (Apr. 2016), "Network Functions Virtualisation (NFV); Acceleration Technologies; vSwitch Benchmarking and Acceleration Specification" NFV-IFA 003v2.1.1—GS—Acceleration—Switching Aspects Spec.pdf (https://docbox.etsi.org/ISG/NFV/Open/Publications_pdf) (22pgs).

(56) References Cited

OTHER PUBLICATIONS

ETSI GS NFV-IFA 003 V2.3.1 (Aug. 2017), "Network Functions Virtualisation (NFV) Release 2; Acceleration Technologies; vSwitch Benchmarking and Acceleration Specification" NFV-IFA 003v2.3.1—GS—Acceleration—Switching Aspects Spec.pdf (https://docbox.etsi.org/ISG/NFV/Open/Publications_pdf) (22pgs).

ETSI GS NFV-IFA 003 V2.4.1 (Dec. 2018), "Network Functions Virtualisation (NFV) Release 2; Acceleration Technologies; vSwitch Benchmarking and Acceleration Specification" NFV-IFA 003v2.4.1—GS—Acceleration—Switching Aspects Spec.pdf (https://docbox.etsi.org/ISG/NFV/Open/Publications_pdf) (22pgs).

ETSI GS NFV-IFA 004 V2.1.1 (Apr. 2016), "Network Functions Virtualisation (NFV); Acceleration Technologies; Management Aspects Specification" NFV-IFA 004v2.1.1—GS—Acceleration—Mgmt aspects Spec.pdf (https://docbox.etsi.org/ISG/NFV/Open/Publications_pdf) (24pgs).

ETSI GS NFV-IFA 004 V2.3.1 (Aug. 2017), "Network Functions Virtualisation (NFV) Release 2; Acceleration Technologies; Management Aspects Specification," NFV-IFA 004v2.3.1—GS—Acceleration—Mgmt aspects Spec.pdf (https://docbox.etsi.org/ISG/NFV/Open/Publications_pdf) (25pgs).

ETSI GS NFV-IFA 004 V2.4.1 (Feb. 2018), "Network Functions Virtualisation (NFV) Release 2; Acceleration Technologies; Management Aspects Specification," NFV-IFA 004v2.4.1—GS—Acceleration—Mgmt aspects Spec.pdf (https://docbox.etsi.org/ISG/NFV/Open/Publications_pdf) (25pgs).

ETSI GS NFV-IFA 005 V2.1.1 (Apr. 2016), "Network Functions Virtualisation (NFV); Management and Orchestration; Or-Vi reference point—Interface and Information Model Specification," NFV-IFA 005v2.1.1—GS—Or-Vi ref point Spec.pdf (https://docbox.etsi.org/ISG/NFV/Open/Publications_pdf) (158pgs).

ETSI GS NFV-IFA 005 V2.3.1 (Aug. 2017), "Network Functions Virtualisation (NFV) Release 2; Management and Orchestration; Or-Vi reference point—Interface and Information Model Specification," NFV-IFA 005v2.3.1—GS—Or-Vi ref point Spec.pdf (https://docbox.etsi.org/ISG/NFV/Open/Publications_pdf) (172pgs).

ETSI GS NFV-IFA 005 V2.4.1 (Feb. 2018), "Network Functions Virtualisation (NFV) Release 2; Management and Orchestration; Or-Vi reference point—Interface and Information Model Specification," NFV-IFA 005v2.4.1—GS—Or-Vi ref point Spec.pdf (https://docbox.etsi.org/ISG/NFV/Open/Publications_pdf) (174pgs).

ETSI GS NFV-IFA 005 V2.5.1 (Aug. 2018), "Network Functions Virtualisation (NFV) Release 2; Management and Orchestration; Or-Vi reference point—Interface and Information Model Specification," NFV-IFA 005v2.5.1—GS—Or-Vi ref point Spec.pdf (https://docbox.etsi.org/ISG/NFV/Open/Publications_pdf) (175pgs).

ETSI GS NFV-IFA 005 V3.1.1 (Aug. 2018), "Network Functions Virtualisation (NFV) Release 2; Management and Orchestration; Or-Vi reference point—Interface and Information Model Specification," NFV-IFA 005v3.1.1—GS—Or-Vi ref point Spec.pdf (https://docbox.etsi.org/ISG/NFV/Open/Publications_pdf) (195pgs).

ETSI GS NFV-IFA 006 V2.1.1 (Apr. 2016), "Network Functions Virtualisation (NFV); Management and Orchestration; Vi-Vnfm reference point—Interface and Information Model Specification," NFV-IFA 006v2.1.1—GS—Vi-Vnfm ref point Spec.pdf (https://docbox.etsi.org/ISG/NFV/Open/Publications_pdf) (109pgs).

ETSI GS NFV-IFA 006 V2.3.1 (Aug. 2017), "Network Functions Virtualisation (NFV) Release 2; Management and Orchestration; Vi-Vnfm reference point—Interface and Information Model Specification," NFV-IFA 006v2.3.1—GS—Vi-Vnfm ref point Spec.pdf (https://docbox.etsi.org/ISG/NFV/Open/Publications_pdf) (117pgs).

ETSI GS NFV-IFA 006 V2.4.1 (Feb. 2018), "Network Functions Virtualisation (NFV) Release 2; Management and Orchestration; Vi-Vnfm reference point—Interface and Information Model Specification," NFV-IFA 006v2.4.1—GS—Vi-Vnfm ref point Spec.pdf (https://docbox.etsi.org/ISG/NFV/Open/Publications_pdf) (118pgs).

ETSI GS NFV-IFA 006 V2.5.1 (Aug. 2018), "Network Functions Virtualisation (NFV) Release 2; Management and Orchestration; Vi-Vnfm reference point—Interface and Information Model Specification," NFV-IFA 006v2.5.1—GS—Vi-Vnfm ref point Spec.pdf (https://docbox.etsi.org/ISG/NFV/Open/Publications_pdf) (114pgs).

ETSI GS NFV-IFA 006 V3.1.1 (Oct. 2018), "Network Functions Virtualisation (NFV) Release 3; Management and Orchestration; Vi-Vnfm reference point—Interface and Information Model Specification," NFV-IFA 006v3.1.1—GS—Vi-Vnfm ref point Spec.pdf (https://docbox.etsi.org/ISG/NFV/Open/Publications_pdf) (131pgs).

ETSI GS NFV-IFA 007 V2.1.1 (Oct. 2016), "Network Functions Virtualisation (NFV); Management and Orchestration; Or-Vnfm reference point—Interface and Information Model Specification," NFV-IFA 007v2.1.1—GS—Or-Vnfm ref point Spec.pdf (https://docbox.etsi.org/ISG/NFV/Open/Publications_pdf) (130pgs).

ETSI GS NFV-IFA 007 V2.3.1 (Aug. 2017), "Network Functions Virtualisation (NFV) Release 2; Management and Orchestration; Or-Vnfm reference point—Interface and Information Model Specification," NFV-IFA 007v2.3.1—GS—Or-Vnfm ref point Spec.pdf (https://docbox.etsi.org/ISG/NFV/Open/Publications_pdf) (143pgs).

ETSI GS NFV-IFA 007 V2.4.1 (Feb. 2018), "Network Functions Virtualisation (NFV) Release 2; Management and Orchestration; Or-Vnfm reference point—Interface and Information Model Specification," FV-IFA 007v2.4.1—GS—Or-Vnfm ref point Spec.pdf (https://docbox.etsi.org/ISG/NFV/Open/Publications_pdf) (145pgs).

ETSI GS NFV-IFA 007 V2.5.1 (Aug. 2018), "Network Functions Virtualisation (NFV) Release 2; Management and Orchestration; Or-Vnfm reference point—Interface and Information Model Specification," NFV-IFA 007v2.5.1—GS—Or-Vnfm ref point Spec.pdf (https://docbox.etsi.org/ISG/NFV/Open/Publications_pdf) (146pgs).

ETSI GS NFV-IFA 007 V3.1.1 (Aug. 2018), "Network Functions Virtualisation (NFV) Release 3; Management and Orchestration; Or-Vnfm reference point—Interface and Information Model Specification," NFV-IFA 007v3.1.1—GS—Or-Vnfm ref point Spec.pdf (https://docbox.etsi.org/ISG/NFV/Open/Publications_pdf) (173pgs).

ETSI GS NFV-IFA 008 V2.1.1 (Oct. 2016), "Network Functions Virtualisation (NFV); Management and Orchestration; Ve-Vnfm reference point—Interface and Information Model Specification," NFV-IFA 008v2.1.1—GS—Ve-Vnfm ref point Spec.pdf (https://docbox.etsi.org/ISG/NFV/Open/Publications_pdf) (83pgs).

ETSI GS NFV-IFA 008 V2.3.1 (Feb. 2018), "Network Functions Virtualisation (NFV) Release 2; Management and Orchestration; Ve-Vnfm reference point—Interface and Information Model Specification," NFV-IFA 008v2.3.1—GS—Ve-Vnfm ref point Spec.pdf (https://docbox.etsi.org/ISG/NFV/Open/Publications_pdf) (103pgs).

ETSI GS NFV-IFA 008 V2.4.1 (Feb. 2018), "Network Functions Virtualisation (NFV) Release 2; Management and Orchestration; Ve-Vnfm reference point—Interface and Information Model Specification," NFV-IFA 008v2.3.1—GS—Ve-Vnfm ref point Spec.pdf (https://docbox.etsi.org/ISG/NFV/Open/Publications_pdf) (103pgs).

International Report on Patentability and Written Opinion dated Dec. 29, 2020 in PCT Application No. PCT/US2019/039603, (10 pgs).

G. Li, H. Zhou, B. Feng, G. Li and Q. Xu, "Horizontal-based orchestration for multi-domain SFC in SDN/NFV-enabled satellite/terrestrial networks," in China Communications vol. 15, No. 5, May 1, 2018 (May 1, 2018), pp. 77-91, XP011685739, ISSN: 1673-5447, DOI: 10.1109/CC.2018.8387988, (15 pgs).

Walter Cerroni, "Intent-Based Management and Orchestration of Heterogeneous OpenFlow/IoT SDN Domains", 2017 IEEE Conference on Network Softwarization (NetSoft), Bologna Available from the Internet: <URL: https://doi.org/10.1109/NETSOFT.2017.8004109>, (10 pgs).

* cited by examiner

SYSTEMS AND METHODS FOR CHAINING CONTROL-PLANE VIRTUAL FUNCTIONS FOR ENSURING END-TO-END QUALITY OF SERVICE (QOS) OF INTERNET SERVICES

BACKGROUND

A. Technical Field

The present disclosure relates generally to systems and methods for Network Functions Virtualization (NFV), and more particularly to NFV applications to ensure end-to-end quality of service (QoS) of Internet service.

B. Background

In Network Functions Virtualization (NFV), "service chaining" may be utilized to facilitate the transfer of information/packets across a number of points in the network(s) and other functions associated with networking. The network(s) may include wireless networks, private networks, Internet connections, a metro link, access networks, premises networks, or another type of network. Network Function Virtualization (NFV) allows for the functions within a box/appliance to be disaggregated, so that some functions such as those in the control-plane can be moved off of Network Element (NE) equipment and instead performed in a cloud, data center or other virtual infrastructure. With NFV, functions that process or control packet flows can be performed by general purpose computing platforms in a data center. Prior art service chaining solutions may use multiple virtual functions to create a network service (NS) which successively operates on user data in a data-plane of the network(s). This method, however, does not affect processes for ensuring end-to-end QoS for Internet services.

Current practice may use ad-hoc methods of providing classes of service (CoS), with non-virtualized systems loosely communicating together, or with various systems performing their functions in an uncoordinated manner. Or, current methods may use a single monolithic system which is unwieldy, difficult to change or upgrade, and not re-usable.

Accordingly, what is needed are systems and methods that provide chaining control-plane virtual functions to ensure end-to-end QoS of Internet services.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

DETAILED DESCRIPTION OF EMBODIMENTS

Figure 1:
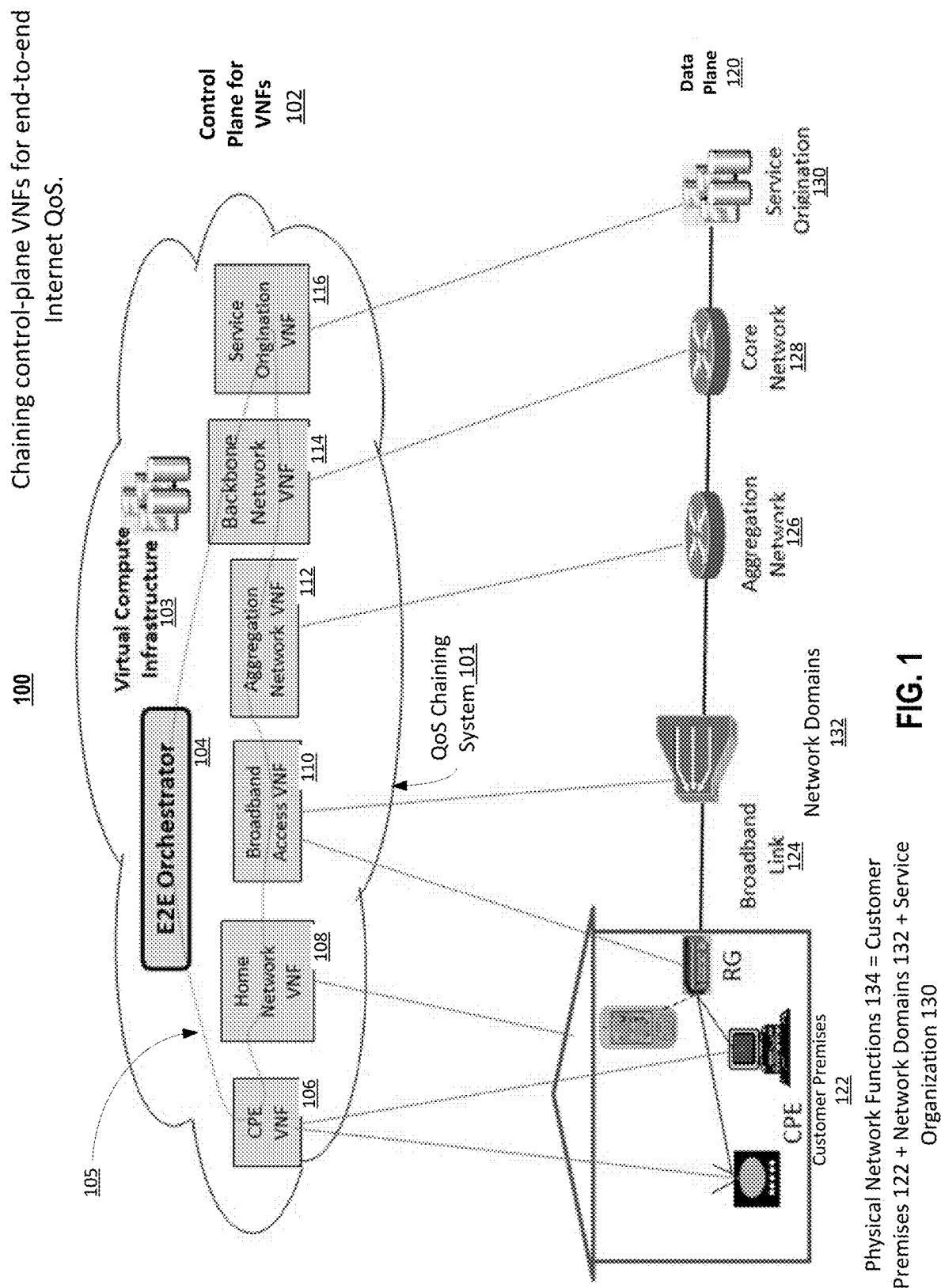
FIG. 1 depicts an exemplary network comprising a QoS chaining system and physical network functions according to embodiments of the present disclosure.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. OVERVIEW

Systems and methods for ensuring end-to-end Quality of Service (QoS) for Internet services by chaining control-plane virtual functions may be referred to herein as "QoS chaining". Classic chaining of Virtual Network Functions (VNFs) passes user data between VNFs in the data-plane to create a Network Service (NS), and is also known as network service chaining or service function chaining (SFC). QoS chaining is enabled by having multiple Virtual Network Functions (VNFs) in the control-plane that are abstractions representing data-plane objects being coordinated or chained by an exemplary apparatus referred to herein as an End-to-End (E2E) orchestrator. QoS chaining may provide the functions of diagnostics, fault management, performance management, configuration, optimization, assign classes of service (CoS), and ensure Quality of Service (QoS) and Quality of Experience (QoE) for services delivered through the Internet. As previously noted, prior art service chaining solutions may use virtual function chains to create a Network Service (NS) which successively operates on user data in the data-plane. This prior art solution is in contrast to an exemplary QoS chaining system, as described herein, which aggregates, analyzes and operates on End-to-End (E2E) QoS data and configuration in the control-plane. Also, an exemplary QoS coordination function, the End-to-End (E2E) orchestrator is described herein.

The systems and methods for QoS chaining, described herein, are generally in the area of providing services over the Internet or over closed networks using the Internet Protocol. These systems and methods may re-use terminology in Network Function Virtualization (NFV), particularly architectural notions such as those for Management and Orchestration (MANO).

QoS chaining is a concept that does not create a network service, but rather ensures the QoS of a service or services. QoS chaining operates at a higher abstraction layer than network service chaining by operating on QoS data and configurations in a control-plane. QoS chaining may also use an exemplary function called an E2E orchestrator to coordinate or chain the interchange of multiple VNFs QoS data and configurations. QoS chaining may bring the benefits of virtualization into an area of multi-system internetwork diagnostics and control. Multiple virtualized functions can physically or logically reside in the same compute infrastructure, and so they can be closely coupled or "chained" together at a tightly coordinated level. QoS chaining represents multiple components of services delivery platforms and networks in a logically centralized location, thereby accruing the benefits of both centralized and distributed systems. QoS chaining can work seamlessly across multiple domains, providers, services, networks, and users. It can assist in providing new services, or increase service levels and bandwidth on demand. QoS chaining may be a specific method of aggregating specific network functions assigned to specific network segments or specific network systems which virtually reflect points in service origination, service termination, and the network.

QoS chaining may abstract the control-plane functions of multiple data-plane elements and systems into an orchestrated set of virtual functions. Performing service assurance across multiple network domains via chained virtualized functions is a concept described herein to facilitate QoS chaining. QoS chaining also may perform Class of Service (CoS) and bandwidth assignments across multiple network domains via orchestrated virtualized functions.

B. System Description

The method and system of QoS chaining control-plane virtual functions for ensuring end-to-end Quality of Service (QoS) of Internet coordinates broadband service delivery via an orchestrated "chain" or Network Service (NS) consisting of control-plane VNFs running in the cloud. Separate service elements, network elements (NEs), network segments, network domains or other service plane or data-plane elements or systems have a separate corresponding constituent VNF in the control-plane that monitors and controls it. QoS is ensured End-to-End (E2E) across the chain of VNFs by coordination through the chain or by a coordinating or integrating E2E orchestrator or E2E VNF. The VNFs may be chained, may communicate directly with each other, and communicate directly with the E2E orchestrator, may communicate with each other through the E2E orchestrator, and may communicate through a shared database.

1. Data-Plane Objects

For example, each of the following data-plane objects may be monitored and controlled at the control-plane via a constituent VNF:

Service origination functions, to ensure functionality and resource assignment for service origination and connection to the network, e.g., servers, cloud, data center, Content Delivery Network (CDN), edge computing infrastructure, fog computing infrastructure, virtual machines, virtual infrastructure, and Over The Top (OTT) provider systems. Service origination functions may be referred to as service origination equipment.

Backbone network functions, to ensure QoS through the backbone network, or core network segments. The backbone network may be considered the same as the transport network or the core network, and may extend into aggregation or access networks. Backbone network functions can include multiple Internet Service Providers (ISPs) and peering connections.

Broadband aggregation network functions to ensure QoS through the broadband aggregation network. The aggregation network may be considered part of the access network.

"Last mile" broadband access network or broadband access line functions to ensure QoS through the broadband access network.

Home gateway or business gateway functions.

Premises network functions to ensure QoS through the customer premises network(s), e.g., Wi-Fi. Customer premises network(s) may be implements with customer premise equipment (CPE) as illustrated in FIG. 1, Customer Premises 122.

Terminal or end-user device functions such as resource allocation functions, e.g., to turn off low-priority, unnecessary, or unimportant functions on the CPE to free up resources for the desired service, or to monitor and diagnose the service.

Functions for servers, devices, data centers, network elements, network segments, network management systems, element management systems, and customer functions.

2. QoS Chaining System

The QoS Network Service (NS) is performed by the QoS chaining system with functions stitched together by the E2E orchestrator or coordinated through the chain. The QoS chaining system can retrieve network test, diagnostics, fault and performance data; perform analyses; then control and configure resource assignment, CoS assignment, and optimizations. The services, service platforms, and networks are monitored to assure QoS performance, and are also controlled to assign QoS levels. Data can be aggregated and processed by the E2E orchestrator, or by a designated VNF or other function. In some embodiments, there may be no explicit E2E orchestrator; instead data may be added and interpreted as it passes through the chain of VNFs.

Diagnostics can be useful on their own, for network monitoring, including monitoring Quality of Service (QoS) and Quality of Experience (QoE), Internet performance and systems faults. Diagnostics can further be used for optimization of QoS by the E2E orchestrator and the VNFs.

Optimization assigns or re-allocates bit rates or bandwidths, routing, switching, class of service (CoS) assignments, priorities, Virtual LAN (VLAN) tags, Multi-Protocol Label Switching (MPLS) tags, Software-Defined Network (SDN) assignments, virtual networking resources, computing resources, CPU utilization, memory, end-user applications, bandwidth, bit rates, or other resources or other resources as necessary to best support services. Optimization can be performed in real-time, on demand, across the VNFs. For example, to support a request for a new or upgraded service to UHDTV, the video stream may need prioritization over other services using the same systems and network segments, or a re-allocation to assign more bandwidth to the video stream may be invoked. Resources on a particular link or device may be re-directed to satisfy a service or user, for example to maintain video quality while delaying a background function such as a software update. Optimization can be affected by varying settings or configuration of NEs, such as routers, switches, access nodes, gateways, firewalls, WAN Optimizers, Deep Packet Inspection (DPI) engines; or optimization can be affected by varying settings or configuration on network management systems or controllers, such as SDN controllers. Hence, optimization functions include assignment of resources and classes of service (CoS).

Data can be aggregated by being passed from VNF to VNF or collected in a function or in a database, with more data added by each VNF such that the output aggregates network data points as represented by VNFs. For example, core, access, and home network VNFs each write the available capacity on their links to a database or file, allowing the bottleneck to be identified across these.

The E2E orchestrator and the VNFs can use machine-learning or reinforcement learning to distill diagnostics data, make decisions, assign resources, and perform optimization.

The QoS chaining system can be used in service qualification, service provisioning, configuration, service initiation, service operation, service accounting, service assurance, QoS assurance, QoE assurance, performance monitoring, fault operations, and other network management functions.

3. E2E Orchestrator

The E2E orchestrator links together, coordinates and integrates the control-plane VNFs at the layer of the control-plane. The E2E orchestrator may be simply called an "orchestrator" and may actually be a function implemented by a VNF or Virtual Network Function Component (VNFC). The E2E orchestrator may be a function or system which is distinct from the NFV system orchestrator. The E2E orchestrator can extract data from the constituent VNFs, and can then control configurations of the corresponding components through each constituent VNF. The E2E orchestrator ensures that the VNFs communicate together and work together properly. The E2E orchestrator can receive data, group, analyze and correlate it for diagnostics, and make global optimizations across the whole QoS chain. Optimization can further proceed end-to-end, with the E2E orchestrator ensuring that service delivery is balanced across control-plane VNFs, with no VNF providing insufficient QoS or consuming too many resources to provide the service delivery. Overall system decisions and outputs can be performed in the E2E orchestrator, or they may be performed in VNF(s), or distributed across multiple such functions.

The two main functions of the E2E orchestrator are diagnostics (monitoring QoS, QoE, performance and faults), and optimization (assigning resources and CoS). Diagnostics compiles end-to-end status, performance and fault data as well as segmented performances of each network segment and service element. For network segments, such performance measures include throughput, packet loss, delay, jitter, faults, availability, performance counters, traffic counters, status, and system-specific or physical-layer specific data. For service originations and terminations, performance measures include CPU usage, memory usage, uptime, and network usage and availability; as well as application specific performance metrics such as estimated Mean Opinion Scores (MOS). The diagnostics data can be used for fault sectionalization, showing what segments or service elements may be degrading performance. The diagnostics data can also be used for fault correlation, to identify the root cause of multiple symptoms. Diagnostics data can be pushed from the data-plane including asynchronous alarms, or it can be pulled from the data-plane to the QoS chain. By accessing data from the control-plane VNFs, the E2E orchestrator analyzes the ensemble of data supplied by the individual VNFs in a more comprehensive manner than can be supported by any individual VNF. Diagnostics may be referred to as diagnostic functions, and optimization may be referred to as optimization functions.

The E2E orchestrator works in conjunction with the control-plane VNFs to perform end-to-end service assurance. The VNFs communicate with each other and the E2E orchestrator, and ensure that each VNF reports sufficient QoS to support the service. This may be completed when the service is first initiated, and also while the service is running. The E2E orchestrator makes sure that no particular network or service element is impairing a particular service. For example, if the service requires a particular bit rate but a network segment is not providing that speed, then that network segment is identified, and the service can further be re-assigned a higher amount of bandwidth or CoS on that network segment which is sufficient to ensure service delivery, QoS, or QoE. The E2E orchestrator can also coordinate QoS and CoS assignments across the multiple VNFs, and for multiple services simultaneously. The E2E orchestrator can perform load balancing among the VNFs.

The E2E orchestrator can configure the control-plane VNFs in many ways, several of which are described in example embodiments herein. What are described as VNFs here may be considered to be Virtual Network Function Components (VNFCs) which are part of a larger resource assignment VNF.

In the ETSI NFV Management and Orchestration (MANO) framework, one or more Virtual Network Function Managers (VNFMs) can manage the lifecycle processes of the VNFs such as instantiation and tear-down. A Virtual Infrastructure Manager (VIM) can manage the NFV Infrastructure (NFVI) platform hosting the VNFs. The Orchestrator may coordinate VNFs, and request instantiation and tear down (or termination) of VNFs which is then managed by one or more VNFMs and VIMs. The functions of the Orchestrator in the NFV MANO framework may overlap with those of the E2E orchestrator for QoS chaining. Instantiation of a QoS chain can be managed with the QoS orchestrator in conjunction with operation of the NFV Virtual Network Function Manager (VNFM) and VIM. Other management systems such as Operations Support Systems (OSS) and Element Management Systems (EMS) can also control parts of QoS chaining. The chain may be described in a way similar to that of a VNF forwarding graph (VNFFG or VNFG) or network service descriptor (NSD).

C. Figures and Example Embodiments

FIG. 1 depicts an exemplary network 100 comprising a QoS chaining system 101 and physical network functions 134 according to embodiments of the present disclosure. The QoS chaining system 101 is in the Control-Plane 102 while the physical network functions 134 are in the Data-Plane 120. Data-Plane 120 may comprise Customer Premises 122 and Network Domains 132 and Service Origination 130. Generically, Data-Plane 120 comprises a plurality of services and elements including service elements, network elements (NEs), network segments, network domains, other service plane or data-plane elements or systems. Service elements are systems or equipment that support service related functions, such as service origination servers, transcoders, or terminal devices. As previously noted, these elements and/or services have a separate corresponding constituent VNF in the control-plane that monitors and controls it. QoS is ensured End-to-End (E2E) across the chain of VNFs by coordination through the chain or by a coordinating or integrating E2E orchestrator or E2E VNF. Data-Plane 120 may also be referred to as physical network functions 134. Service Origination 130 may comprise more than one service organizations.

Separate VNFs, included in Control-Plane 102, may diagnose and may also configure separate constituent parts of the network, or separate functions in the network. Per FIG. 1 there are separate VNFs for monitoring and control of (1) Customer Premises 122 including Customer Premises Equipment (CPE), Home Network (e.g., Wi-Fi), Residential Gateways (RG), and (2) Network Domains 132 including Broadband Access network and links 124, Aggregation Network 126, Core Network 128, and Service Origination 130. The separate VNFs included in Control-Plane 102 may include CPE VNF 106, Home Network VNF 108, Broadband Access VNF 110, Aggregation Network VNF 112, Backbone Network VNF 114, and Service Origination VNF 116. The VNFs are "chained" together via E2E Orchestrator 104 as indicated by line 105.

The CPE VNF 106 performs device management, and the various network and other VNFs perform network management, monitor and configure communication links. The Service Origination VNF 116 manages, for example, video servers and their controllers. The VNFs run on virtual compute infrastructure 103 or NFV Infrastructure (NFVI). The QoS chaining system can also run on bare metal infrastructure. Note that some of the separate constituent parts of the network, or separate functions in the network, may themselves be VNFs or may be PNFs.

VNFs themselves can be composed of multiple VNFCs. The functionality and interfaces of a VNF can be described by a Virtual Network Function Descriptor (VNFD), which is used by the E2E orchestrator 104 to determine details of how to compose interactions within the QoS chaining system 101. The QoS chaining system 101 can be considered to be a variant of a Network Service (NS).

Figure 2:
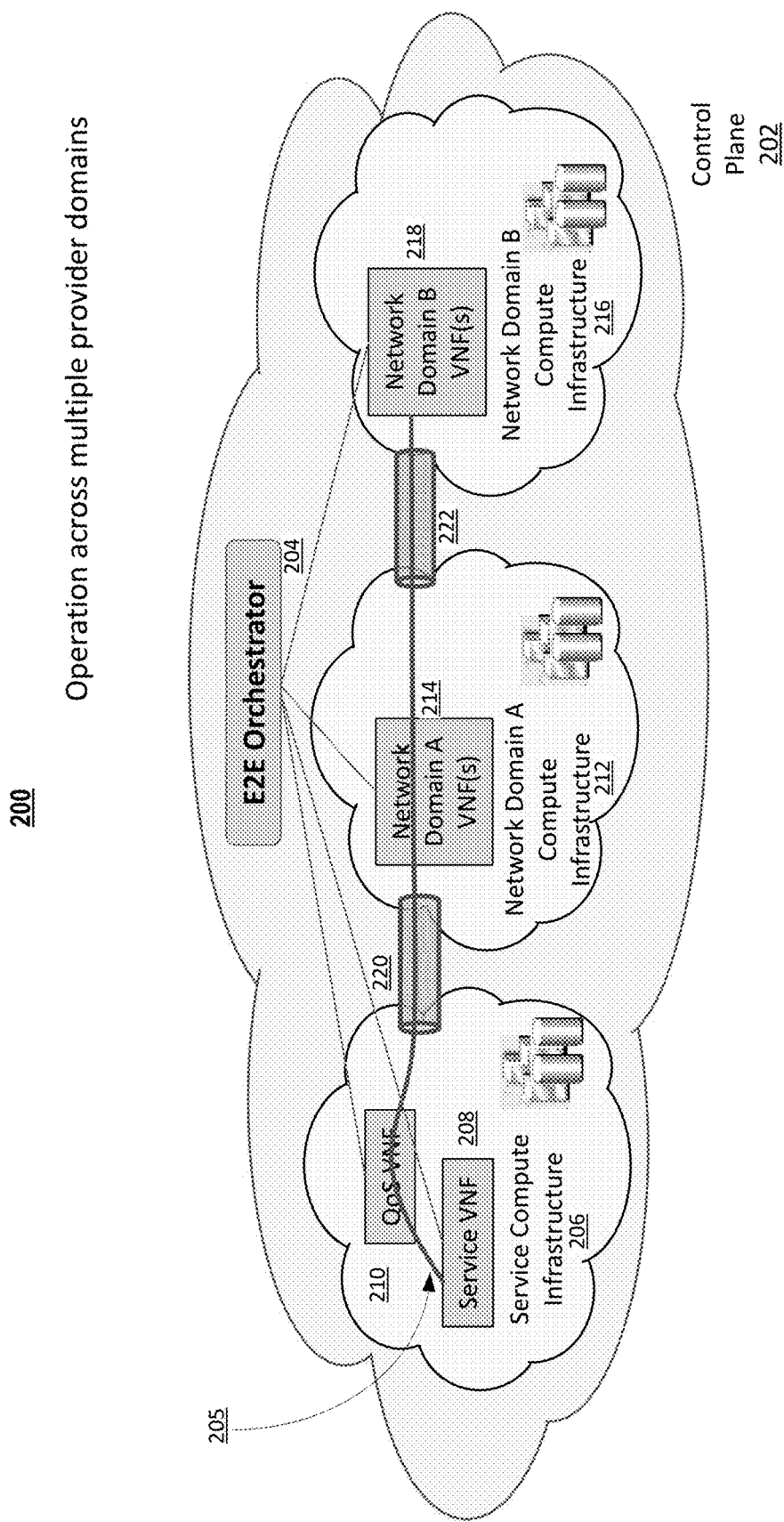
FIG. 2 depicts an exemplary operation across multiple provider domains according to embodiments of the present document.

FIG. 2 depicts exemplary operation 200 across multiple provider domains according to embodiments of the present document. More specifically, FIG. 2 shows that the VNFs can be administered via Control-lane 202 by multiple service providers, network providers, software providers, third parties, etc.; and can be in multiple domains. FIG. 2 has a service domain (i.e., Service VNF 208) and two network domains denoted as A and B (Network Domain A VNF(s) 214, and Network Domain B VNF(s) 218). The VNFs may be hosted in a single computing infrastructure or cloud, or in multiple infrastructures as shown in FIG. 2 via Service Compute Infrastructure 206, Network Domain A Compute Infrastructure 212 and Network Domain B Compute Infrastructure 216. The infrastructure can be physically located in one data center, or it may run on disparate servers, data centers, cloud infrastructure, cloud CO infrastructure, edge computing infrastructure, fog computing infrastructure, virtual machines, or virtual infrastructure. Multiple infrastructures are networked together to enable an end-to-end service to be coordinated by the E2E orchestrator 204 or E2E VNF. The VNFs are "chained" together via E2E Orchestrator 204 as indicated by line 205.

Service VNF 208 may be supported by QoS VNF 210, as illustrated in FIG. 2. Network Domain B VNF(s) 218 may be coupled to Network Domain A VNF(s) 214 via network pipe 222, and Network Domain A VNF(s) 214 may be coupled to QoS VNF 210 via network pipe 220.

Figure 3:
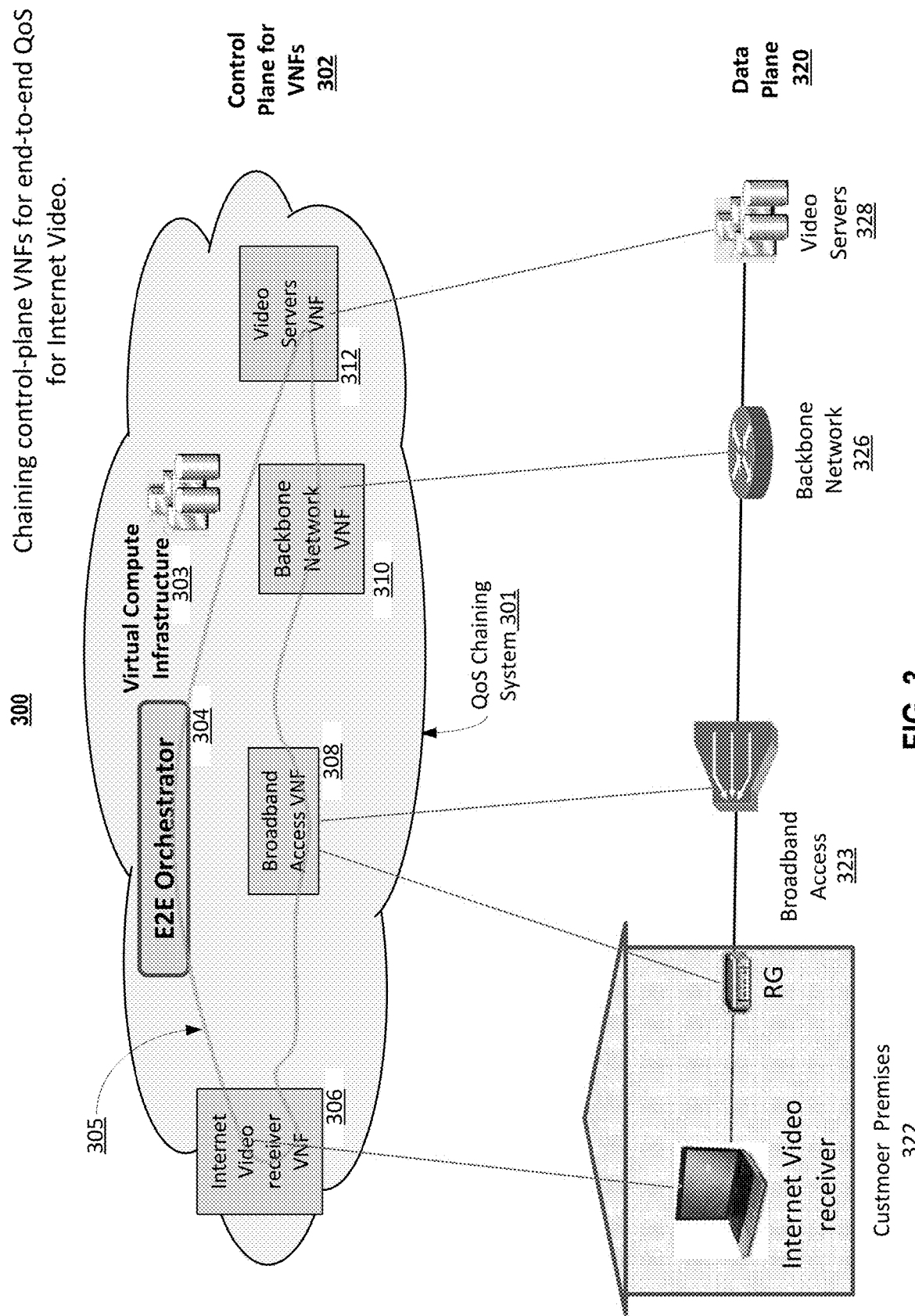
FIG. 3 depicts Virtual Network Functions (VNFs) in a control-plane and components in a data-plane implementing an exemplary network comprising a QoS chaining system for Internet video according to embodiments of the current disclosure.

FIG. 3 depicts Virtual Network Functions (VNFs) in a Control-Plane 302 and components in a Data-Plane 320 implementing an exemplary network 300 comprising QoS chaining system 301 for Internet video or Internet Protocol TV (IPTV) service according to embodiments of the current disclosure. A simplified view of the devices and networks involved is shown in Data-Plane 320, including customer premises 322 (Internet video decoder and display, residential gateway (RG), broadband access network 323, backbone network 326 (i.e., core network), and video streaming servers 328. The corresponding VNFs are also shown at the Control-Plane 302: Internet video receiver VNF 306, broadband access VNF 308, backbone network VNF 310 (core network), and video servers VNF 312. The line 305 running through the VNFs and E2E orchestrator illustrates the QoS chaining system. Also illustrated are E2E Orchestrator 304 and Virtual Compute Infrastructure 303.

Figure 4:
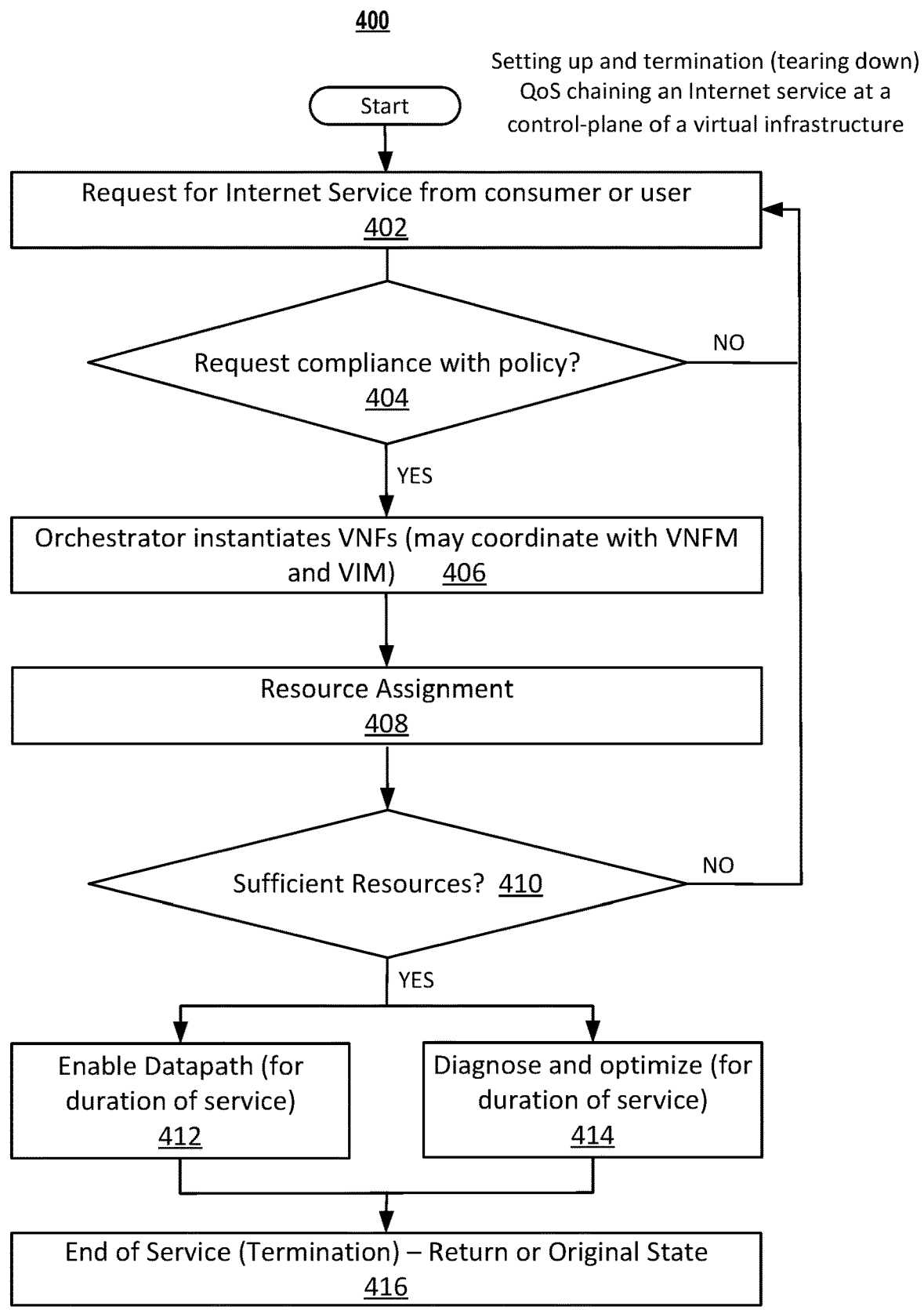
FIG. 4 depicts an exemplary flow chart for setting up QoS chaining according to embodiments of the present disclosure.

FIG. 4 depicts an exemplary flow chart for setting up QoS chaining according to embodiments of the present disclosure. More specifically, FIG. 4 shows a high-level exemplary flow chart 400 for an Internet service that includes setting up (instantiating) and tearing down QoS chaining of an Internet service which are lifecycle operations. First, there is a request for some type of service from a consumer or user to be delivered over the Internet, possibly also using a closed network (step 402). The request is checked for compliance with policy (within allowed, subscribed, billed service levels, etc.) (step 404); if not then the request is to be reviewed by the consumer (i.e., repeat step 402), if so then the QoS chain is built. First, the orchestrator instantiates necessary VNFs, possibly in conjunction with a VNFM and/or VIM (step 406). The VNFs then assign resources for the service in their respective domains (step 408). Resource assignment may include assigning CoS levels and bandwidth. Then a determination may be made on the sufficiency of the resources (step 410), generally by the E2E orchestrator. If resources are sufficient for providing the service, then the flow proceeds, otherwise the request is returned for re-evaluation (step 402). The penultimate step is to enable the E2E datapath through service functions and network segments (step 412), while simultaneously diagnosing and optimizing the service across service functions and network segments (step 414). In this penultimate step, each VNF in the QoS chain is responsible for QoS, diagnostics and optimization within their segment or function with the E2E orchestrator overseeing all of these items. Finally, service terminates, and the QoS chain and its associated VNFs can be deleted or returned to their original state (step 416).

Figure 5:
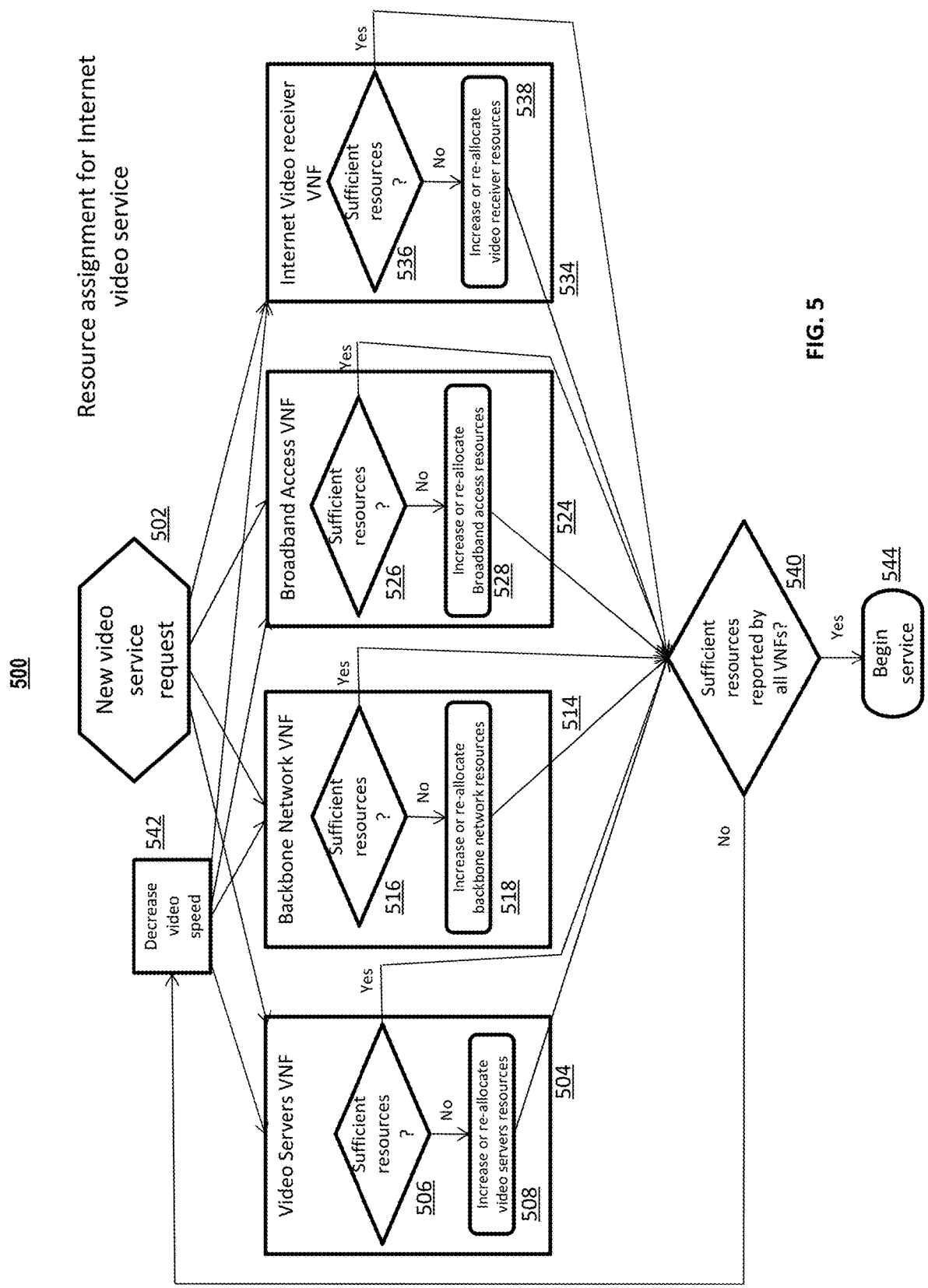
FIG. 5 depicts an exemplary flow chart for resource assignment via QoS chaining for Internet video services according to embodiments of the present disclosure.

FIG. 5 depicts an exemplary flow chart 500 for resource assignment via QoS chaining for Internet video services according to embodiments of the present disclosure. When a new video service or stream view is requested (step 502), the video servers VNF 504 ensures there will be sufficient resources at the video servers (CPU, memory, network connection, etc.) to transmit the video (steps 506, and 508). The backbone network VNF 514 then ensures there will be sufficient bandwidth in the backbone network, with sufficient quality (delay, loss, jitter, etc.), to transport the video stream through the backbone network (steps 516, and 518). The broadband access VNF 524 then ensures there will be sufficient bandwidth and quality through the broadband access network (steps 526, and 528) to transport the video stream. The Internet video receiver VNF 534 then ensures there are sufficient resources on the terminal device (CPU, memory, etc.) to receive, decode, and display the video service (steps 536, and 538). If any control-plane VNF finds insufficient resources, then it attempts to provide sufficient resources in its own domain (steps 508, 518, 528, 538), for example by assigning unused resources, taking bandwidth from a less sensitive service such as from a non-delay-critical download, or by assigning CoS levels and bandwidth, or by assigning a higher priority to the video service or application, or by shutting down less important computing tasks, such as shutting down or putting to sleep unused applications on a smartphone or PC. If a VNF still cannot provide sufficient resources to support the video stream, then it notifies the other VNFs and the E2E orchestrator, and then the video servers VNF lowers the resources consumed by the service (in this case the bit rate of the streaming video is lowered) (steps 508, 518, 528, 538). The other VNFs are notified of this change, and then again each VNF performs resource assignments toward ensuring end-to-end service quality. This process can further iterate, as shown in FIG. 5. The determination of whether sufficient resources to support the video stream are available (steps 506, 516, 526, 536), or an increase of re-allocation of resources is recommended (steps 508, 518, 528, 538) is analyzed, sufficient resources reported by the VNFs? (step 540). If yes, the service begins (step 544). If no, the video speed is decreased and the process is repeated as illustrated in FIG. 5 (step 542). While the video is streaming, the E2E orchestrator can continuously monitor the VNFs to ensure sufficient QoS is being maintained for the video stream at a the network segments and service endpoints.

Figure 6:
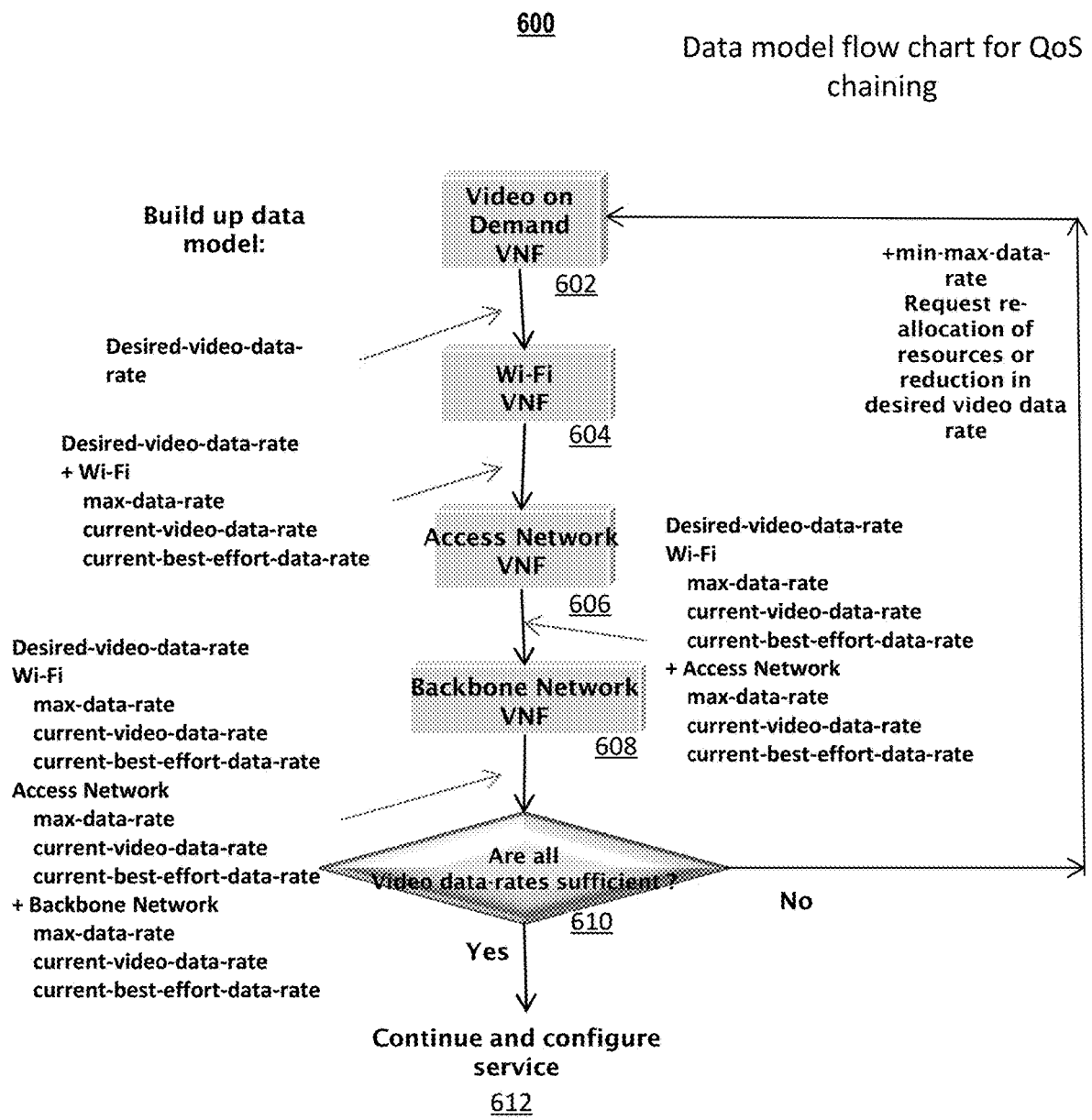
FIG. 6 depicts an exemplary data model flow chart for QoS chaining according to embodiments of the present document.

FIG. 6 depicts an exemplary data model flow chart 600 for QoS chaining according to embodiments of the present document. The QoS chain runs from the video on demand VNF (step 602), to the Wi-Fi VNF (step 604), to the access network VNF (step 606), then to the backbone network VNF (step 608). Each VNF adds information to the QoS data model. In the example, the video on demand VNF (step 602) writes the desired video data rate into the QoS data model and passes the QoS data model to the Wi-Fi VNF. Then the Wi-Fi VNF (step 604) writes the maximum attainable data rate, and the current data rates for two Classes of Service (CoS), video and best-effort, for Wi-Fi into the QoS data model. The access network VNF and the backbone network VNF then write similar data into the QoS data model (steps 606, 608). The E2E orchestrator, or a designated VNF in the chain or some other function, receives the data model, and if the current data rates are sufficient to transport the data (step 610), then service commences (step 612). Otherwise the data model returns to the top of the chain along with a parameter indicating the minimum of the maximum data rates across Wi-Fi, Access, and Backbone (step 602). Thereafter, each VNF attempts to increase the current video data rate in their segment, which may be done by shifting current best-effort data rate into current video data rate. The process then continues and may iterate through steps 602, 604, 606, 608 and 610 if the video on demand VNF must decrease the desired video data rate, during this process the data model is updated. The data model for this example may include:
Desired-video-data-rate
Wi-Fi
max-data-rate
current-video-data-rate
current-best-effort-data-rate
Access Network
max-data-rate
current-video-data-rate
current-best-effort-data-rate
Backbone Network
max-data-rate
current-video-data-rate
current-best-effort-data-rate
min-max-data-rate.

Figure 7:
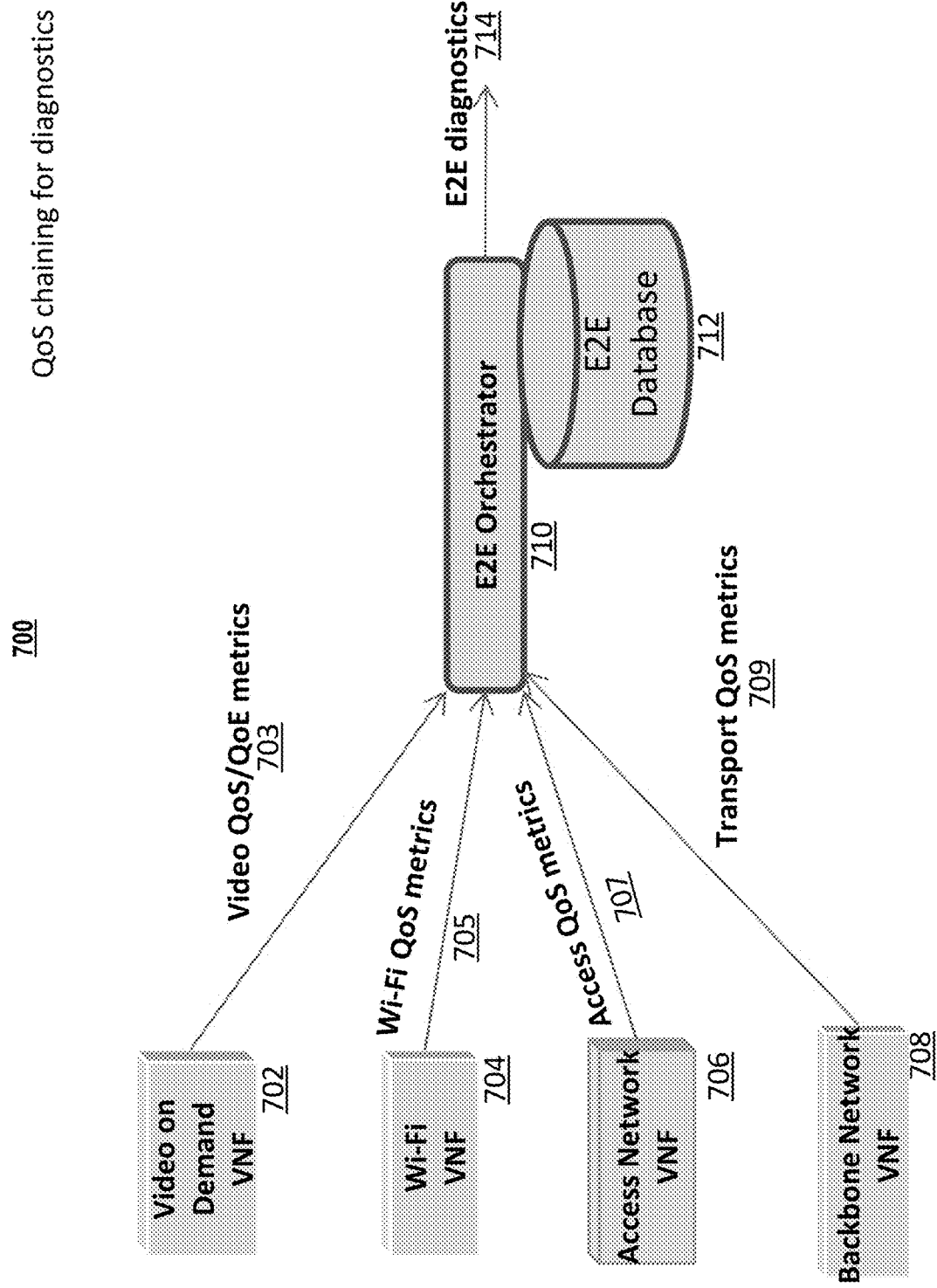
FIG. 7 graphically illustrates exemplary QoS chaining for diagnostics according to embodiments of the present document.

FIG. 7 graphically illustrates an exemplary QoS chaining for diagnostics 700 according to embodiments of the present document. Each VNF passes diagnostics data to the E2E orchestrator 710 and/or the E2E database 712. This includes Video on demand VNF 702 passing Video QoS/QoE metrics 703, WiFi VNF 704 passing WiFi Qos metrics 705, Access Network VNF 706 passing Access QoS metrics 707, and Backbone Network 708 passing Transport QoS metrics 709.

Diagnostics data can include data rates, error rates, delay, jitter, etc. and service-specific and network-specific metrics. Each VNF may have specific diagnostics related to its particular physical layer or function. The diagnostics are collected by the E2E orchestrator, put in the E2E database, combined, and distilled to provide overall E2E diagnostics 714. Note that a data model approach similar to FIG. 6 could alternatively be used for building up diagnostics data by passing the diagnostics data model from one VNF to the other.

Figure 8:
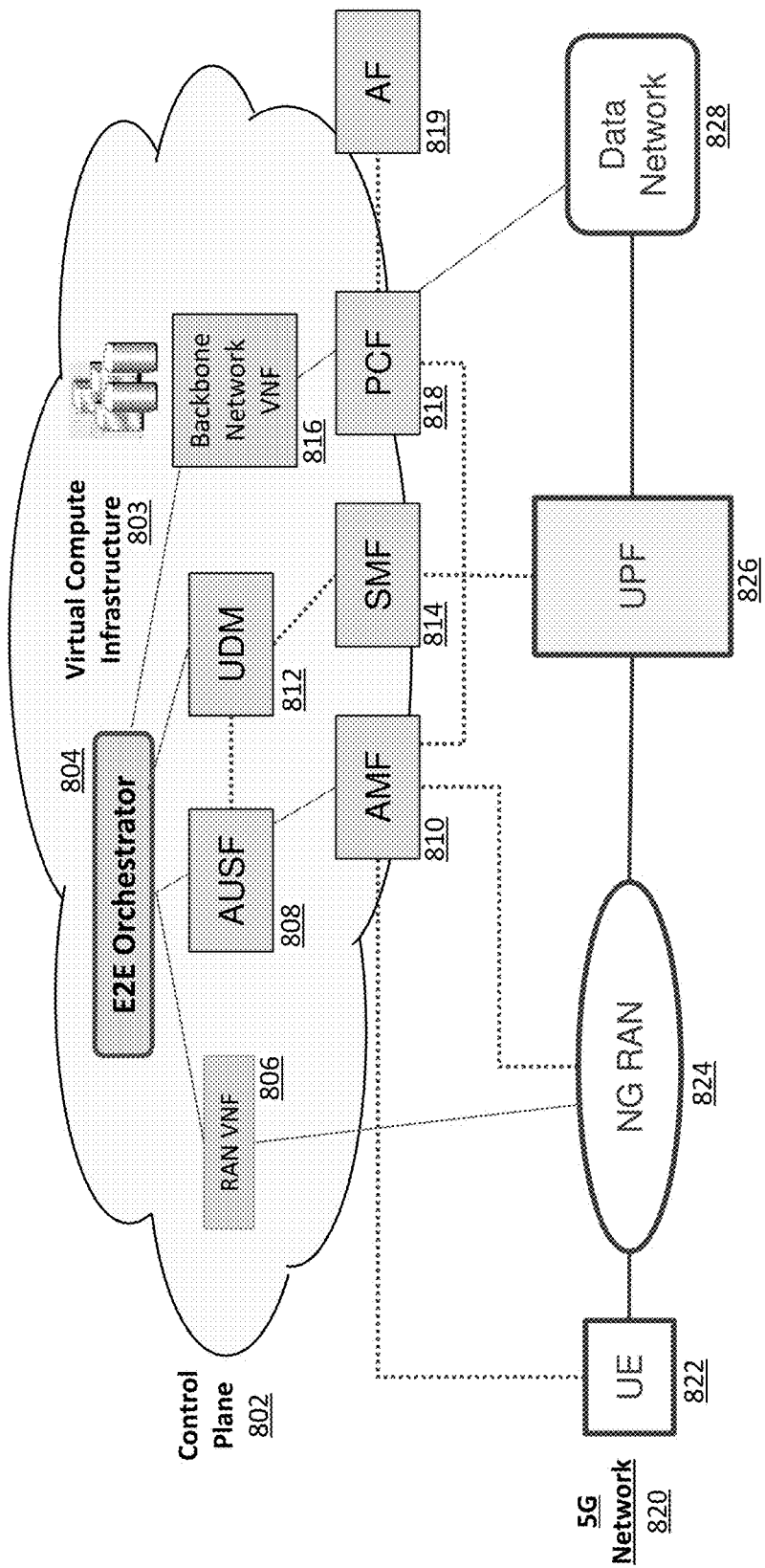
FIG. 8 depicts exemplary QoS chaining for wireless services according to embodiments of the present document.

FIG. 8 depicts exemplary QoS chaining for wireless services 800 according to embodiments of the present document. This embodiment is similar to FIG. 1 and FIG. 3, but is adapted to support wireless services such as 4G/5G. In FIG. 8, some or all of the functions in the following components are VNFs, or have associated QoS VNFs, which may be part of the QoS chain. The functions are supported by Virtual Compute Infrastructure 803, Control-Plane 802, and 5G Network 820.

E2E Orchestrator 804
 RAN VNF 806—Radio Access Network VNF
 Backbone Network VNF 816
 AUSF 808—Authentication Server Function
 UDM 812—Unified Data Management
 AMF 810—Access &Mobility Management Function
 SMF 814—Session Management Function
 PCF 818—Policy Control Function
 AF 819—Application Function
 UPF 826—User Plane Function
 NG RAN 824—Next Generation Radio Access Network
 UE 822—User Equipment
 Data Network 828

D. Alternative Embodiments

The QoS chaining system can simultaneously operate over multiple services across multiple users; and can provide varying QoS levels and assign resources and configure CoS as appropriate for each type of service and service level.

The QoS chaining system can work with OTT providers, and can span multiple administrative domains across multiple companies and other entities. The QoS chaining system may work in a network sharing environment or a wholesale-retail environment. The QoS chaining system may be implemented by a service provider, Infrastructure network Provider (InP), virtual network operator (VNO), network operator, a third party, a hosting service, or some combination of these entities. The VNFs, E2E orchestrator, and management systems can be administered by multiple entities. The VNFs, E2E orchestrator, and management systems can be instantiated on multiple computing infrastructures (servers, clouds, data centers, edge computing fabric).

The E2E orchestrator and individual VNFs can interact with other network management systems, such as traditional Operations Support Systems (OSS), Network Management Systems (NMS), and Element Management Systems (EMS). This can involve both data exchange messages and control messages, and these systems can help assess and improve service quality and end-to-end QoS similar to VNFs. Some aspects may or may not be managed in real-time.

The QoS chaining system can support or provide real-time services ordering, such as increasing bandwidth on demand (e.g., turbo-boost), or adding a new service. The QoS chaining system can interact with Billing Support Systems (BSS) and ordering systems to provide these services and ensure service quality in real-time.

The QoS chaining system can interact with consumer-driven requests for on-demand services or to report impaired service delivery. These requests can be made through an app or software agent, which interacts with the VNFs or other cloud-based management systems.

A virtual probe (vProbe) can be one of the VNFs in the QoS chain. Or the vProbe can be used by one or more of the VNFs to access data from network elements. The vProbe is a software "probe" which obtains diagnostic, test and performance data from various network elements or network systems via messaging across the network control-plane. The vProbe offers a convenient and re-usable data collection system which may be accessed by multiple virtual systems.

The QoS chaining system can work with different types of broadband connections, and with multiple broadband connections. Such connections can include any type of wireline broadband including copper, coax and fiber; wireless, Wi-Fi, and powerline communications. Each broadband connection may have a separate associated VNF, or a VNF could span multiple broadband connections. The VNFs and the E2E orchestrator can ensure QoS for services by using part or all of the combined bandwidth of multiple broadband connections. The QoS level desired by a service can be mapped to a corresponding QoS level provided by a connection, for example a real-time streaming service could be assigned to transmit over a fiber access link, while a non-real time download could be assigned to transmit over LTE.

QoS chaining can be used with wireless networks, wireless backhaul, wireless fronthaul, converged wireline and wireless networks and services provided over these networks. This includes cellular data connections such as Long-Term Evolution (LTE), 3G, 4G and 5G; Wi-Fi, super Wi-Fi, Bluetooth, Zwave, Zigbee, etc.

In summary, a virtualized QoS chaining system running on cloud or virtual infrastructure can manage Internet service delivery via multiple control-plane Virtual Network Functions (VNFs) that are coordinated by an End-to-End (E2E) orchestrator. The QoS chaining system can manage a plurality of data-plane service elements, network segments, network domains, devices, or other data-plane objects, each have a corresponding VNF in the control-plane that monitors and controls it, and wherein the E2E orchestrator coordinates these VNFs to provide end-to-end QoS across data plane objects. One or more of the VNFs can be organized together by one or more of: 1) being linked together in a QoS chain, 2) communication with the E2E orchestrator, 3) accessing a data model, 4) accessing a common database, and 5) communication between VNFs, by passing data between VNFs. The QoS chaining system can retrieve or collect one or more of: status, diagnostics, performance data, test data, and fault data. Lifecycle operations of the QoS chain are further managed, including instantiation and tear-down. The data can include one or more of: throughput, packet loss, delay, jitter, faults, availability, performance counters, system-specific data, physical-layer specific data, CPU usage, memory usage, network usage, uptime availability, application-specific performance metrics, and estimated Mean Opinion Scores (MOS). The data can be aggregated, analyzed, diagnosed, or processed by the E2E orchestrator, or by one or more VNF(s), or by the E2E orchestrator and one or more VNF(s). The functions of the E2E orchestrator can be distributed across one or more VNF(s).

The virtualized QoS chaining system, or QoS chaining system, can encompass one or more of: data-plane Physical Network Functions (PNFs), virtual functions, or functions running on bare metal infrastructure. The virtualized QoS chaining system can be used for one or more of the following operations: service qualification, service provisioning, service initiation, service operation, configuration, service accounting, diagnostics, status monitoring, performance monitoring, network monitoring, service assurance, QoS assurance, QoE assurance, performance monitoring, services monitoring, test operations, service assurance service level monitoring, alarm management, fault operations, fault correlation, or fault sectionalization. The virtualized QoS chaining system can assign, allocate, schedule, or load balance resources to ensure and optimize services delivery. Resources can include one or more of: computing resources, bandwidth, speed, Class of Service (CoS), Quality of Service (QoS), priorities, Virtual LAN (VLAN) tags, Multi-Protocol Label Switching (MPLS) tags, Software-Defined Networks (SDN) assignments, virtual networking resources, computing resources, CPU utilization, memory, end-user applications, bandwidth, bit rates, or other resources. The virtualized QoS chaining system can re-assign or re-allocat unused, unnecessary, or unimportant resources from other services.

The QoS chaining system can operate in an iterative loop with the following order: a) with data from network monitoring being analyzed, then b) determining how to assign and allocate resources for each VNF and across VNFs, then c) performing control and configuration functions to implement the determined assignment, then d) start at a) again. One or more of the following data-plane functions, systems or objects have corresponding Virtual Network Functions (VNFs) at the control plane: Service origination, backbone network, broadband aggregation network, broadband access network, home gateway, business gateway, premises network, terminal devices, servers, devices, data centers, network elements, service elements, network segments, network management systems, element management systems, customer functions.

The QoS chaining system can facilitate the managing one or more of: DSL, G.fast, G.mgfast, Passive Optical Networks (PON), active Ethernet, powerline communications, cable modem, mobile wireless communications, fixed wireless communications, Wi-Fi, wireless backhaul, wireless fronthaul, converged wireline and wireless networks, cellular data connections such as Long-Term Evolution (LTE), 3G, 4G and 5G; Wi-Fi, super Wi-Fi, Wi-Fi HaLow, Bluetooth, Zwave, or Zigbee.

The QoS chaining system is capable of machine-learning or reinforcement learning to perform analyses or to orchestrate management. The QoS chaining system can interact with another network management system, including Operations Support Systems (OSS), Network Management Systems (NMS), Element Management Systems (EMS), or Billing Support Systems (BSS). The QoS chaining system can perform one or more of: real-time services ordering, real-time services instantiation, real-time services modification, and real-time services accounting. The QoS chaining system can respond to requests initiated by a consumer or user for new or improved services. The QoS chaining system can utilize a virtual probe (vProbe) for data collection.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:
1. A QoS chaining system comprising:
a plurality of Virtual Network Functions (VNFs) that are abstractions representing corresponding data-plane objects, which operate on quality of service (QoS) data and configurations in a control-plane, wherein by operating on quality of service (QoS) data and configurations in a control-plane, QoS chaining operates at a higher abstraction layer than network service chaining and
an End-to-End (E2E) orchestrator, positioned in the control-plane, that chains the plurality of VNFs to provide end-to-end QoS across the corresponding data-plane objects including data-plane service elements and/or network elements,
wherein the QoS chaining system runs on a virtual infrastructure and manages Internet delivery services via the plurality of VNFs and the E2E orchestrator,
wherein each of the data-plane service elements and/or network elements have a corresponding VNF in the control-plane that monitors and controls each of the corresponding data-plane objects,
wherein each of the corresponding VNFs provide a function of diagnostics for each of the corresponding data-plane objects,
wherein the QoS chaining system provides real-time services operations, wherein the plurality of VNFs are configured to be chained, to communicate directly with each other, to communicate directly with the E2E orchestrator, to communicate with each other through the E2E orchestrator, and to communicate through a shared database.

2. The system of claim 1, wherein the QoS chaining system provides additional functions of fault management, performance management, configuration, optimization, assigning classes of service (CoS), and ensuring Quality of Service (QoS) or Quality of Experience (QoE) for services delivered through the Internet.

3. The system of claim 2, wherein the additional functions are implemented by the E2E orchestrator.

4. The system of claim 2, wherein the additional functions are implemented by one or more VNF(s), or by the E2E orchestrator and one or more VNF(s).

5. The system of claim 1, wherein the E2E orchestrator simultaneously provides varying QoS levels, assigns resources and configures classes of service (CoS) assignments across multiple VNFs, and for multiple services.

6. The system of claim 1, wherein the QoS chaining system operates in an iterative loop comprising the steps of: a) monitoring and analyzing data from one or more network domains, then b) determining a process to assign and allocate resources for each VNF and across VNFs, then c) performing control and configuration functions to implement a determined assignment.

7. A method comprising:
simultaneously operating a QoS chaining system on a virtual infrastructure over multiple services across multiple users;
managing Internet service delivery on the virtual infrastructure via multiple Virtual Network Functions (VNFs) which operate on a control-plane of the QoS chaining system;
monitoring and controlling data-plane service elements and/or network elements via a corresponding VNF in the control-plane; and
providing end-to-end QoS of Internet services across the data-plane service elements and/or network elements via an End-to-End (E2E) orchestrator that coordinates the multiple VNFs,
wherein the QoS chaining system is operable to perform diagnostic and optimization functions in real-time, on demand and across the multiple VNFs,
wherein by operating on quality of service (QoS) data and configurations in the control-plane, QoS chaining operates at a higher abstraction layer than network service chaining, and
wherein the multiple VNFs are configured to be chained, to communicate directly with each other, to communicate directly with the E2E orchestrator, to communicate with each other through the E2E orchestrator, and to communicate through a shared database.

8. The method of claim 7, wherein the each of the corresponding VNFs provide the function of diagnostics for corresponding data-plane objects.

9. The method of claim 8, wherein the diagnostic functions include monitoring Quality of Service (QoS) and Quality of Experience (QoE), Internet performance and systems faults.

10. The method of claim 8, wherein the optimization functions include assignment of resources and classes of service (CoS).

11. The method of claim 8, wherein the diagnostic functions and the optimization functions of the E2E orchestrator are distributed across one or more VNFs.

12. The method of claim 7, wherein the data-plane service elements and/or network elements comprise one or more Physical Network Functions (PNFs), virtual functions and/or functions running on bare metal infrastructure, wherein the one or more PNFs comprise customer premise equipment, network domains, and service originations.

13. A method of instantiating and terminating a QoS chain for an Internet service at a control-plane of a virtual infrastructure comprising:
receiving a request for the Internet service by a user;
confirming the request is in compliance with a policy;
establishing the QoS chain and instantiating Virtual Network Functions (VNFs) in the control-plane;
assigning resources by the VNFs for the Internet service in their respective domains;
confirming sufficient resources exist in their respective domains to transport a video stream; and
enabling an end-to-end datapath through service elements and network elements while simultaneously diagnosing and optimizing the Internet service,
wherein the QoS chain is operable to provide real-time services operations that support the video stream, and
wherein by operating on quality of service (QoS) data and configurations in a control-plane, QoS chaining operates at a higher abstraction layer than network service chaining, and
wherein the VNFs are configured to be chained, to communicate directly with each other, to communicate directly with an E2E orchestrator, to communicate with each other through the E2E orchestrator, and to communicate through a shared database.

14. The method of claim 13, further comprising:
waiting to receive another request for the Internet service when (1) the request is not in compliance with the policy, and/or (2) sufficient resources do not exist to transport the video stream in the respective domains of the VNFs.

15. The method of claim 13, wherein the virtual infrastructure is capable of diagnosing and optimizing QoS data via an end-to-end (E2E) orchestrator, or by one or more VNF(s), or by the E2E orchestrator and one or more VNF(s).

16. The method of claim 13, wherein instantiating of VNF(s) in the control-plane occurs in conjunction with operation of a Virtual Network Function Manager (VNFM) and/or Virtual Infrastructure Manager (VIM).

17. The system of claim 2, wherein the QoS chaining system is operable to perform optimization functions in real-time, on demand and across the plurality of VNFs.

18. The system of claim 1, wherein data is aggregated by the E2E orchestrator, or by one or more VNF(s), or by the E2E orchestrator and the one or more VNF(s).

19. The method of claim 7, wherein data is aggregated by one or more VNF(s).

20. The method of claim 13, wherein the real-time services operations comprise real-time ordering, real-time services instantiation, real-time services modification and/or real-time services accounting.

* * * * *